(12) United States Patent
Casey et al.

(10) Patent No.: US 8,638,939 B1
(45) Date of Patent: Jan. 28, 2014

(54) USER AUTHENTICATION ON AN ELECTRONIC DEVICE

(75) Inventors: Brandon J. Casey, San Jose, CA (US); Erik Cressall, San Jose, CA (US)

(73) Assignee: Apple Inc., Cupertino, CA (US)

( * ) Notice: Subject to any disclaimer, the term of this patent is extended or adjusted under 35 U.S.C. 154(b) by 767 days.

(21) Appl. No.: 12/544,944

(22) Filed: Aug. 20, 2009

(51) Int. Cl.
*H04L 29/06* (2006.01)

(52) U.S. Cl.
USPC .......... 380/277; 380/278; 380/279; 380/280; 380/281; 380/282; 380/283; 380/284; 380/285; 380/286; 726/1; 726/26; 713/171; 705/71

(58) Field of Classification Search
USPC ............................................ 380/277; 726/19
See application file for complete search history.

(56) References Cited

U.S. PATENT DOCUMENTS

| | | | |
|---|---|---|---|
| 5,465,084 | A | 11/1995 | Cottrell |
| 5,559,961 | A | 9/1996 | Blonder |
| 5,677,710 | A | 10/1997 | Thompson-Rohrlich |
| 5,768,387 | A | 6/1998 | Akiyama |
| 5,821,933 | A | 10/1998 | Keller et al. |
| 5,907,327 | A | 5/1999 | Ogura et al. |
| 5,953,710 | A | 9/1999 | Fleming |
| 6,151,208 | A | 11/2000 | Barlett |
| 6,160,555 | A | 12/2000 | Kang et al. |
| 6,192,478 | B1 | 2/2001 | Elledge |
| 6,249,606 | B1 | 6/2001 | Kiraly et al. |
| 6,323,846 | B1 | 11/2001 | Westerman et al. |
| 6,347,290 | B1 | 2/2002 | Bartlett |
| 6,421,453 | B1 * | 7/2002 | Kanevsky et al. ............ 382/115 |
| 6,466,969 | B1 * | 10/2002 | Bunney et al. ................. 709/206 |
| 6,570,557 | B1 | 5/2003 | Westerman et al. |
| 6,573,883 | B1 | 6/2003 | Barlett |
| 6,609,113 | B1 | 8/2003 | O'Leary et al. |
| 6,633,310 | B1 | 10/2003 | Andrew et al. |
| 6,677,932 | B1 | 1/2004 | Westerman |
| 6,720,860 | B1 | 4/2004 | Narayanaswami |
| 6,735,695 | B1 | 5/2004 | Gopalakrishnan et al. |
| 6,749,114 | B2 | 6/2004 | Madani |
| 6,886,801 | B2 | 5/2005 | Hallback |

(Continued)

FOREIGN PATENT DOCUMENTS

| EP | 1284450 | 2/2003 | |
|---|---|---|---|
| EP | 1284450 A2 * | 2/2003 | ............ G06F 3/033 |

(Continued)

OTHER PUBLICATIONS

Jansen et al, "Authentication Users on Handheld Devcies", May 2003.*

(Continued)

*Primary Examiner* — Andy Rao
*Assistant Examiner* — Shan Elahi
(74) *Attorney, Agent, or Firm* — Morgan, Lewis & Bockius LLP

(57) ABSTRACT

The present disclosure provides for the use of non-alphanumeric, non-biometric inputs to authenticate a user accessing secured data or functions on an electronic device. In one embodiment, an authentication screen is invoked by use of a gesture input via a touch-sensitive structure. In such an embodiment, an authentication screen may be invoked with no outward appearance on the display as to the existence of the data or function for which access is sought. The authentication may be based upon a gesture, a sequence of selected objects, or another non-alphanumeric, non-biometric input.

24 Claims, 25 Drawing Sheets

(56) References Cited

U.S. PATENT DOCUMENTS

| | | | |
|---|---|---|---|
| 6,903,681 | B2 | 6/2005 | Faris |
| 6,954,862 | B2 | 10/2005 | Serpa |
| 6,985,137 | B2 | 1/2006 | Kairkuranta |
| 7,124,433 | B2 | 10/2006 | Little |
| 7,151,843 | B2 | 12/2006 | Rui et al. |
| 7,174,462 | B2 | 2/2007 | Pering et al. |
| 7,249,092 | B2 | 7/2007 | Dunn et al. |
| 7,263,670 | B2 | 8/2007 | Rekimoto |
| 7,286,063 | B2 | 10/2007 | Gauthey et al. |
| 7,331,518 | B2 | 2/2008 | Rable |
| 7,333,947 | B2 | 2/2008 | Wiebe et al. |
| 7,357,310 | B2 | 4/2008 | Calabrese et al. |
| 7,395,506 | B2 | 7/2008 | Tan et al. |
| 7,453,443 | B2 | 11/2008 | Rytivaara et al. |
| 7,480,870 | B2 | 1/2009 | Anzures |
| 7,593,000 | B1 | 9/2009 | Chin |
| 7,627,904 | B2 | 12/2009 | Tokkonen |
| 7,653,818 | B2 | 1/2010 | Serpa |
| 7,657,849 | B2 | 2/2010 | Chaudhri |
| 8,159,327 | B2 * | 4/2012 | Faith et al. .................. 340/5.81 |
| 2001/0011308 | A1 | 8/2001 | Clark et al. |
| 2001/0012022 | A1 | 8/2001 | Smith |
| 2002/0015024 | A1 | 2/2002 | Westerman et al. |
| 2002/0082995 | A1 | 6/2002 | Christie, IV |
| 2002/0196274 | A1 | 12/2002 | Comfort et al. |
| 2003/0028481 | A1 | 2/2003 | Flitcroft et al. |
| 2003/0034185 | A1 | 2/2003 | Kairkuranta |
| 2003/0135463 | A1 | 7/2003 | Brown |
| 2003/0142138 | A1 | 7/2003 | Brown et al. |
| 2004/0021108 | A1 | 2/2004 | Hallback |
| 2004/0030934 | A1 | 2/2004 | Mizoguchi et al. |
| 2004/0034598 | A1 | 2/2004 | Robinson |
| 2004/0034801 | A1 | 2/2004 | Jaeger |
| 2004/0054929 | A1 | 3/2004 | Serpa |
| 2004/0083394 | A1 | 4/2004 | Brebner |
| 2004/0085351 | A1 | 5/2004 | Tokkonen |
| 2004/0088568 | A1 | 5/2004 | Tokkonen |
| 2004/0230843 | A1 | 11/2004 | Jansen |
| 2004/0250138 | A1 | 12/2004 | Schneider |
| 2004/0258429 | A1 * | 12/2004 | Moroi ............................. 399/80 |
| 2004/0260955 | A1 | 12/2004 | Mantyla |
| 2004/0268267 | A1 | 12/2004 | Moravcsik |
| 2005/0050477 | A1 | 3/2005 | Robertson et al. |
| 2005/0060554 | A1 | 3/2005 | O'Donoghue |
| 2005/0079896 | A1 | 4/2005 | Kokko et al. |
| 2005/0212760 | A1 | 9/2005 | Marvit et al. |
| 2005/0216862 | A1 | 9/2005 | Shinohara et al. |
| 2005/0246278 | A1 | 11/2005 | Gerber et al. |
| 2005/0248542 | A1 | 11/2005 | Sawanobori |
| 2005/0253817 | A1 * | 11/2005 | Rytivaara et al. ............. 345/173 |
| 2005/0264833 | A1 | 12/2005 | Hiraoka et al. |
| 2005/0273624 | A1 | 12/2005 | Serpa |
| 2006/0006226 | A1 | 1/2006 | Fitzgerald et al. |
| 2006/0010042 | A1 | 1/2006 | Gianakis et al. |
| 2006/0031162 | A1 | 2/2006 | Brundage et al. |
| 2006/0031776 | A1 | 2/2006 | Glein et al. |
| 2006/0074698 | A1 | 4/2006 | Bishop et al. |
| 2006/0085357 | A1 | 4/2006 | Pizarro |
| 2006/0098899 | A1 * | 5/2006 | King et al. .................... 382/305 |
| 2006/0105742 | A1 | 5/2006 | Kim et al. |
| 2006/0131390 | A1 | 6/2006 | Kim |
| 2006/0136846 | A1 * | 6/2006 | Im et al. ........................ 715/863 |
| 2006/0161870 | A1 | 7/2006 | Hotelling et al. |
| 2006/0174339 | A1 | 8/2006 | Tao |
| 2006/0267951 | A1 | 11/2006 | Rainsto |
| 2006/0267955 | A1 | 11/2006 | Hino |
| 2007/0118475 | A1 | 5/2007 | Picciallo et al. |
| 2007/0130547 | A1 | 6/2007 | Boillot |
| 2007/0250920 | A1 * | 10/2007 | Lindsay .......................... 726/7 |
| 2008/0006685 | A1 | 1/2008 | Rackley, III et al. |
| 2008/0010190 | A1 | 1/2008 | Rackley, III et al. |
| 2008/0010191 | A1 | 1/2008 | Rackley, III et al. |
| 2008/0010193 | A1 | 1/2008 | Rackley, III et al. |
| 2008/0010204 | A1 | 1/2008 | Rackley, III et al. |
| 2008/0016232 | A1 | 1/2008 | Yared |
| 2008/0027844 | A1 | 1/2008 | Little et al. |
| 2008/0034292 | A1 | 2/2008 | Brunner et al. |
| 2008/0034307 | A1 | 2/2008 | Cisler et al. |
| 2008/0040265 | A1 | 2/2008 | Rackley, III et al. |
| 2008/0055263 | A1 | 3/2008 | Lemay et al. |
| 2008/0055269 | A1 | 3/2008 | Lemay et al. |
| 2008/0072172 | A1 | 3/2008 | Shinohara et al. |
| 2008/0078831 | A1 | 4/2008 | Johnson et al. |
| 2008/0082934 | A1 | 4/2008 | Kocienda et al. |
| 2008/0094371 | A1 | 4/2008 | Forstall et al. |
| 2008/0108324 | A1 | 5/2008 | Moshir |
| 2008/0122796 | A1 | 5/2008 | Jobs et al. |
| 2008/0126145 | A1 | 5/2008 | Rackley |
| 2008/0134170 | A1 | 6/2008 | Astheimer |
| 2008/0162346 | A1 | 7/2008 | Aaron |
| 2008/0166998 | A1 | 7/2008 | Sun et al. |
| 2008/0207203 | A1 | 8/2008 | Arthur et al. |
| 2008/0208743 | A1 | 8/2008 | Arthur |
| 2009/0098854 | A1 | 4/2009 | Park |
| 2009/0128581 | A1 | 5/2009 | Brid et al. |
| 2009/0165121 | A1 * | 6/2009 | Kumar ............................ 726/19 |
| 2009/0239587 | A1 * | 9/2009 | Negron et al. ................ 455/566 |
| 2009/0271633 | A1 * | 10/2009 | Cohen ........................... 713/185 |
| 2010/0099390 | A1 * | 4/2010 | Vendrow et al. ........... 455/414.1 |

FOREIGN PATENT DOCUMENTS

| | | | | |
|---|---|---|---|---|
| EP | 1696626 | | 8/2006 | |
| EP | 1696626 A1 * | | 8/2006 | ............. H04L 29/06 |
| GB | 2313460 | | 11/1997 | |
| JP | 60171560 | | 9/1985 | |
| JP | 2249062 | | 10/1990 | |
| JP | 6214954 | | 8/1994 | |
| JP | 2007323613 | | 12/2007 | |
| WO | WO0233882 | | 4/2002 | |
| WO | WO 0233882 A1 * | | 4/2002 | ................ H04L 9/00 |
| WO | WO0233882 A1 * | | 4/2002 | ................ H04L 9/00 |
| WO | WO04001560 | | 12/2003 | |
| WO | WO 04001560 A1 * | | 12/2003 | ................ G06F 1/00 |
| WO | WO04001560 A1 * | | 12/2003 | ................ G06F 1/00 |
| WO | WO2004021108 | | 3/2004 | |
| WO | WO2004021108 A2 * | | 3/2004 | ................ G06F 1/00 |
| WO | WO 2004021108 A2 * | | 3/2004 | ................ G06F 1/00 |

OTHER PUBLICATIONS

De Luca et al "PassShape—Stroke based Shape Passwords", 2007.*
Jameel et al, Image-Feature Based Human Identification Protocols on Limited Display Device, 2009.*
"Touch Password Protection," JGUI Professional, http://www.jgui.net/touch/index.html, Dec. 8, 2003.
PCT International Search Report for International Application No. PCT/US2006061370, mailed May 25, 2007.
McLean, et al.; "Access/Control Icons (Icon Keys)," IBM Technical Disclosure Bulletin, vol. 38, No. 4, Apr. 1995, pp. 407-409.
International Search Report for International Application No. PCT/US2006061380, mailed Apr. 23, 2007.
Bardram, J., "The Trouble With Login: on usability and computer security in Ubiquitous Computing," Centre for Pervasive Healthcare, Department of Computer Science, University of Aahus, Published online: Jul. 23, 2005.
Fitzpatrick, G., et al.; "Method for Access Control via Gestural Verification," IBM Technical Disclosure Bulletin, vol. 36, No. 09B, Sep. 1993, 2 pages.
IBM, "Touch Pad Authentication," Sep. 21, 2004, 2 pages.
Jansen, W., "Authenticating Users on Handheld Devices," The National Institute of Standards and Technology, Gaithersburg, Maryland, 2003, 13 pages.
Jermyn, I., et al.,; "The Design and Analysis of Graphical Passwords," Submission to the 8th USENIX Security Symposium, Aug. 1999, 15 pages.
Monrose, N.; "Towards Stronger User Authentication," Ph.D. Dissertation, 1999, New York University, vol. 60/05-B of Dissertation Abstract International, Order No. AAD99-30229, 115 pages.
Najjar, I.; "Graphical Passwords," International Technology Disclosures, vol. 10, No. 1, Jan. 25, 1992, 1 page.

(56) References Cited

OTHER PUBLICATIONS

Renaud, K., et al.; "My Passsword is Here! An Investigation into Visuo-Spatial Authentication Mechanisms," 2004, 25 pages, www.sciencedirect.com.

Wiedenbeck, S., et al.; "PassPoints: Design and Longitudinal Evaluation of a Graphical Password System," International Journal of Human-Computer Studies, vol. 63, Issues -1-2, Jul. 2005, pp. 102-127.

Office Action dated Feb. 7, 2008 for related application; U.S. Appl. No. 11/322,549.

Office Action dated Feb. 4, 2009, received in the German patent application which corresponds to U.S. Appl. No. 11/322,549.

Office Action dated Mar. 25, 2009, received in the European patent application which corresponds to U.S. Appl. No. 11/322,549.

GridLock 1.32, Oct. 8, 2003, pp. 1-2, http://gridlock.en.softonic.com/palm.

Horry, Youichi, et al.; A Passive-Style Buttonless Mobile Terminal, IEEE Transactions on Consumer Electronics, vol. 49, No. 3, Aug. 2003, pp. 530-535.

Notice of Allowance dated Sep. 19, 2008 related to U.S. Appl. No. 11/322,550.

Office Action dated Oct. 31, 2007 for related U.S. Appl. No. 11/322,550.

Office Action dated Apr. 21, 2008 for related U.S. Appl. No. 11/322,550.

Office Action dated Sep. 26, 2008, for related U.S. Appl. No. 11/322,549.

Final Office Action dated Mar. 23, 2009, for related U.S. Appl. No. 11/322,549.

Neonode, Inc., "Welcome to the N1 Guide," neonode.com, Jul. 2004, 42 pages, www.ebookspdf.com/gadget/2818/neonode-n1m-manual/.

European Search Report dated Oct. 13, 2009, received in European Patent Application No. 09170574.9.

Office Action dated Jul. 24, 2009, received in U.S. Appl. No. 12/345,584.

Office Action dated Nov. 16, 2009, received in U.S. Appl. No. 12/345,584.

Office Action dated Feb. 5, 2010, received in Chinese Application for Invention No. 200680052779.4, which corresponds to U.S. Appl. No. 11/322,549.

Office Action dated Feb. 9, 2010, received in German Patent Application No. 11 2006 003 515.0-53, which corresponds to U.S. Appl. No. 11/322,549.

Office Action dated Mar. 5, 2010, received in Korean Patent Application No. 10-2008-7018109, which corresponds to U.S. Appl. No. 11/322,549.

Ilium Software, "Users Guide and Reference: Version 6.1," Jul. 2008 (available electronically at: www.iliumsoft.com/dl/doc/eWallet.pdf (accessed Apr. 9, 2009)).

Gridlock Manual, "Gridlock v.1.32", published Oct. 31, 2008, 6 pgs., found at http://www.pdabusiness.com/gridlock/manual/manual.html.

U.S. Appl. No. 12/544,935, filed Aug. 20, 2009, Casey et al.
U.S. Appl. No. 12/544,950, filed Aug. 20, 2009, Casey et al.
U.S. Appl. No. 12/351,687, filed Jan. 9, 2009, Casey et al.
U.S. Appl. No. 12/351,649, filed Jan. 9, 2009, Casey et al.
U.S. Appl. No. 12/351,714, filed Jan. 9, 2009, Casey et al.
U.S. Appl. No. 12/351,724, filed Jan. 9, 2009, Casey et al.
U.S. Appl. No. 12/351,674, filed Jan. 9, 2009, Casey et al.

* cited by examiner

USER AUTHENTICATION ON AN ELECTRONIC DEVICE

BACKGROUND

The present disclosure relates generally to controlling access to information or applications stored on an electronic device, such as a handheld or portable device. This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Portable electronic devices, such as notebook computers, cellular telephones, personal digital assistants (PDAs), and so forth, are commonly used to store various types of confidential information. Such confidential information may include phone numbers, personal and professional contacts, information related to finances or financial accounts, business related projects, personal photos or videos, and so forth. While storing such confidential information on a portable electronic device allows the user greater flexibility in terms of how, when, and where to use such data, it also increases the risk that the confidential data may be lost or stolen. In particular, if the portable electronic device is lost or stolen, any confidential information stored on the device may be at risk.

Conventional security measures, such as the use of alphanumeric security codes (e.g., passwords or personal identification numbers (PINs)), may fail to provide adequate security. In particular, screens or fields for entering a password or PIN may be obvious to a bystander who may be able to view the security code and will recognize the code to be a password or PIN. In addition, users often select passwords or PINS that can be guessed, such as passwords based on the names of family members or pets or PINS that are based on birthdays. Security codes such as these may be guessed by acquaintances or others who have only a casual relationship with the owner of the device and thus do not provided a high degree of security for the stored confidential information. Thus, use of conventional alphanumeric security codes may provide insufficient security for confidential information stored on portable or other electronic devices.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to the use of security measures based on non-alphanumeric inputs that are user configurable (as opposed to biometric inputs) to control access to restricted information or functions. For example, access to confidential information may be based on a gesture input via a touch-sensitive input device, such as a touch screen or touchpad. In such implementations, the gesture may be converted into a cryptographic key to allow access to encrypted data and/or to functions that are accessed using a cryptographic key. Likewise, a gesture may be used to invoke an authentication screen for accessing confidential information or functions that is otherwise not available.

Alternatively, access to confidential information may be based on selection of a series of displayed objects in a particular sequence. In such an implementation, the objects may be photos, icons, or other displayed objects that appear to part of a standard interface or application screen of the device, i.e., when displayed the options do not appear to be associated with a security or login functionality of the device. In certain embodiments, the order or placement of the displayed objects may be randomized with each invocation of the authentication screen.

Further, other non-alphanumeric, non-biometric inputs may also be part of the user authentication process. For example, inputs from a Global Positioning System (GPS) provided with the electronic device may be a factor in accessing confidential information. In such an example, access may be prohibited at certain locations or only allowed at certain locations Likewise, different access schemes may be employed at certain locations, i.e., no access control at some locations, password or PIN protection at other locations, and non-alphanumeric access control at other locations. Such location based controls may also be implemented to take into account other factors that may be determined on the device, such as day and time.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques allow for securely accessing encrypted and/or hidden information or functions stored on an electronic device. Examples of such information and functions may include bank account or credit card information (as well as other types of financial information), personal contacts, personal photos, applications that allow or invoke confidential information, and networks or similar communication options that may be accessible via an electronic device. The information or functions may be accessed using non-alphanumeric (e.g., characters or elements not found on a keyboard), non-biometric inputs that are user configurable, such as gestures or sequence codes. In certain embodiments, an initial screen may not display any reference to the existence of the confidential data or function or any visible selection related to accessing such data or function and an initial gesture input may be employed to invoke the display of additional authentication screens that may be used to access the confidential data or functions.

In addition, sequence-based approaches may utilize existing screens that do not appear to relate to user authentication, thus allowing a user to be authenticated without any displayed or visible indication that such an authentication is occurring. For example, an authentication sequence may be entered on a screen that appears to be a standard user interface screen displaying application icons, with the sequence of icons selected providing the authentication. In such an example, a bystander may see nothing more than a user selecting one or more applications on the user interface, with no visible indication that a user authentication is occurring. In addition, other inputs, such as the location of the device, day, and/or time, may be utilized in the authentication process.

Figure 1:
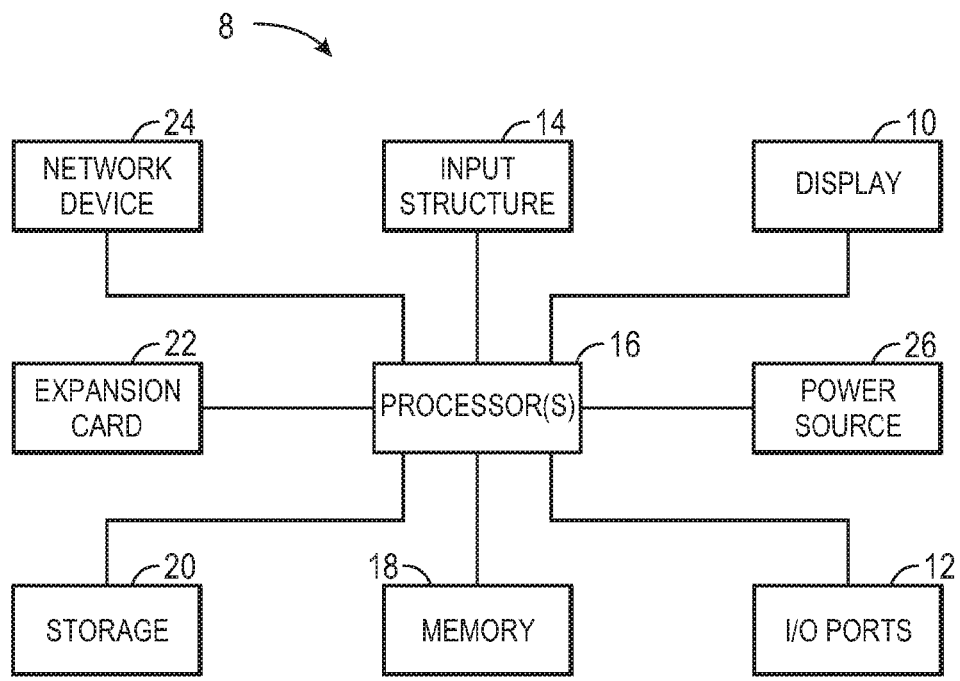
FIG. 1 is a block diagram of exemplary components of an electronic device, in accordance with aspects of the present disclosure.
Figure 3:
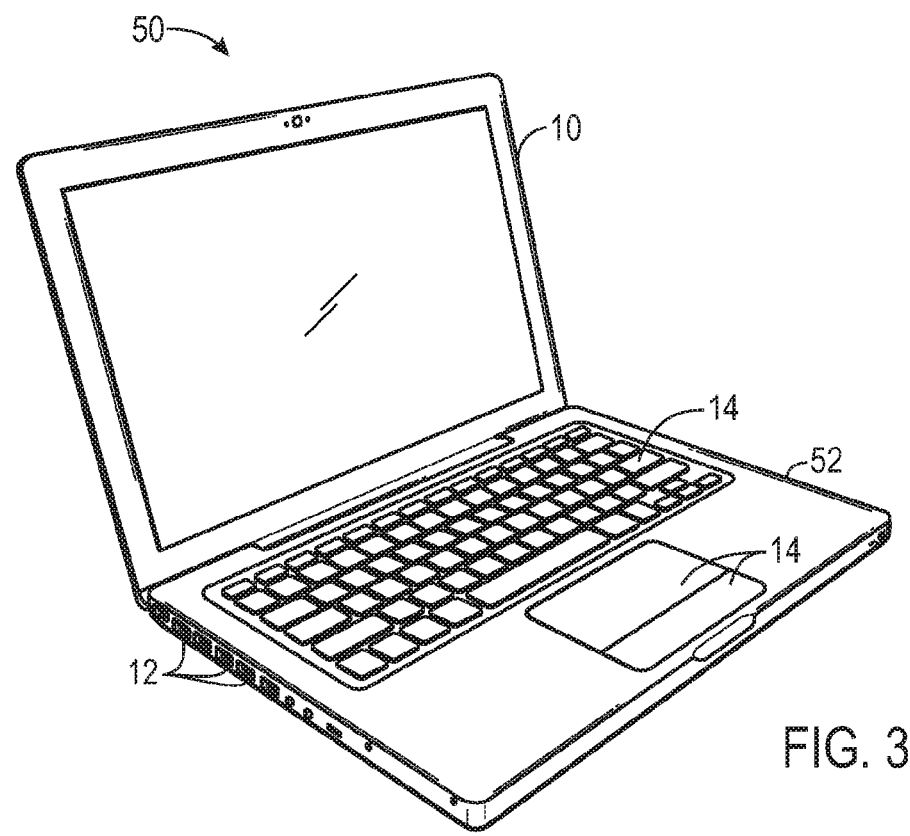
FIG. 3 is a view of a computer for use in accordance with aspects of the present disclosure.
Figure 2:
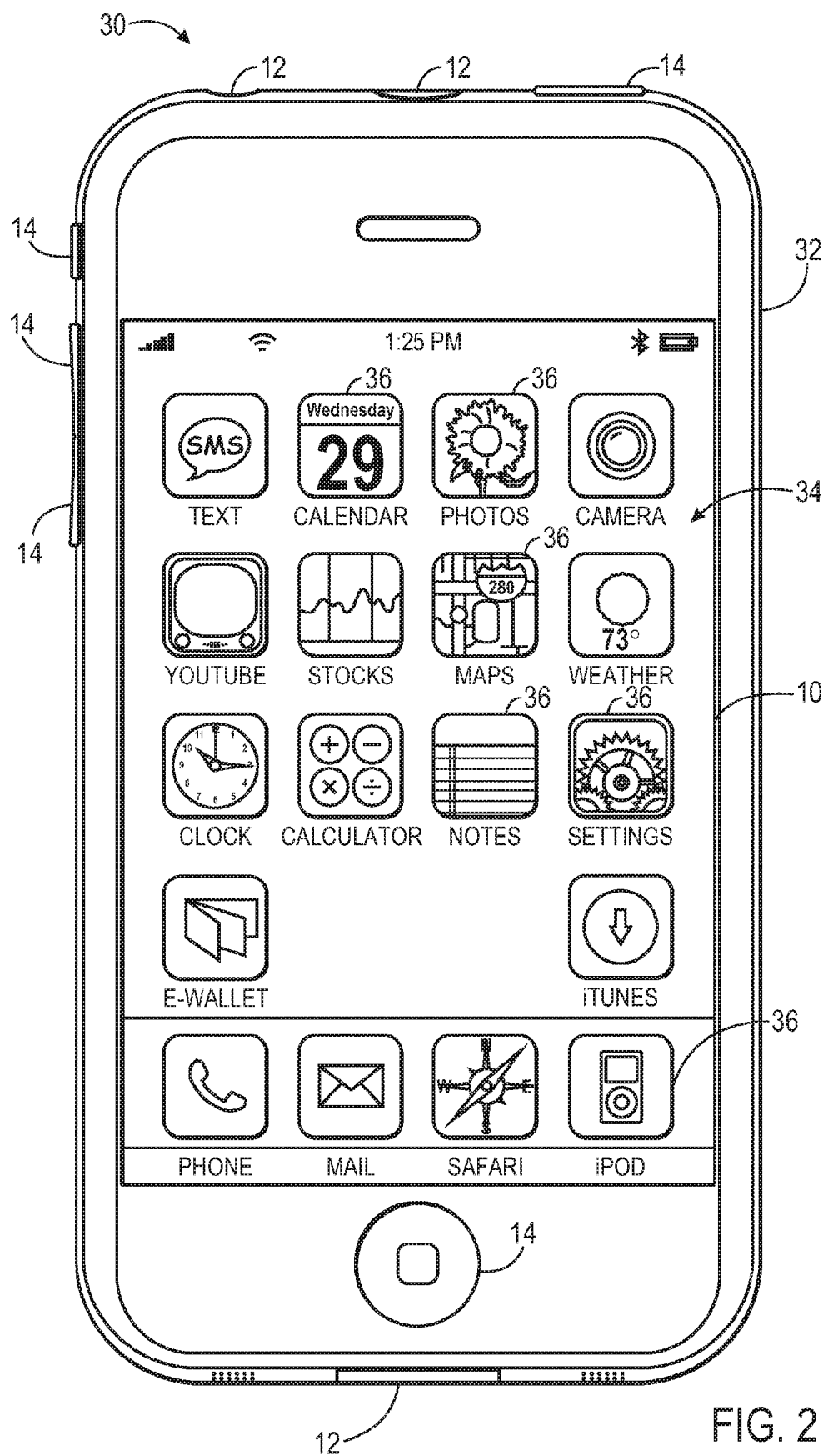
FIG. 2 is a front view of a handheld electronic device in accordance with aspects of the present disclosure.

With these foregoing features in mind, a general description of suitable electronic devices for implementing aspects of the present techniques is provided. In FIG. 1, a block diagram depicting various components that may be present in electronic devices suitable for use with the present techniques is provided. In FIG. 2, one example of a suitable electronic device, here provided as a handheld electronic device, is depicted. In FIG. 3, another example of a suitable electronic device, here provided as a computer system, is depicted. These types of electronic devices, and other electronic devices providing suitable storage and/or processing capabilities, may be used in conjunction with the present techniques. For example, these and similar types of electronic devices may implement non-alphanumeric, non-biometric authentication schemes to access hidden or confidential information or functions in accordance with the teachings of the present disclosure.

An example of a suitable electronic device may include various internal and/or external components which contribute to the function of the device. FIG. 1 is a block diagram illustrating the components that may be present in such an electronic device 8 and which may allow the device 8 to function in accordance with the techniques discussed herein. As will be appreciated, the various functional blocks shown in FIG. 1 may include hardware elements (including application specific or generic circuitry), software elements (including computer code stored on a machine-readable medium) or a combination of both hardware and software elements. It should further be noted that FIG. 1 is merely one example of a particular implementation and is merely intended to illustrate the types of components that may be present in a device 8. For example, in the presently illustrated embodiment, these components may include a display 10, I/O ports 12, input structures 14, data processing circuitry, such as one or more processors 16, a memory device 18, a non-volatile storage 20, expansion card(s) 22, a networking device 24, and a power source 26.

With regard to each of these components, the display 10 may be used to display various images generated by the device 8. The display 10 may be any type of display such as a cathode ray tube (CRT), a liquid crystal display (LCD), a light emitting diode (LED) display, an organic light emitting diode (OLED) display, or other suitable display. In certain embodiments of the electronic device 8, the display 10 may include a touch-sensitive element, such as a touch screen.

The I/O ports 12 may include ports configured to connect to a variety of external devices, such as a power source or other electronic devices (such as handheld devices and/or computers, printers, projectors, external displays, modems, docking stations, and so forth). The I/O ports 12 may support any standard or proprietary interface type, such as a universal serial bus (USB) port, a video port, a serial connection port, a IEEE-1394 port, an Ethernet or modem port, and/or an AC/DC power connection port.

The input structures 14 may include the various devices, circuitry, and pathways by which input or feedback is provided to data processing circuitry, such as the processor 16. Such input structures 14 may be configured to control a function of the device 8 when actuated. For example, the input structures 14 may include buttons, sliders, switches, control pads, keys, knobs, scroll wheels, keyboards, mice, touchpads, and so forth. In certain embodiments, the input structures 14 may also include such components as global positioning system (GPS) circuitry and/or accelerometers that convey information about the location and/or orientation of the device 8 to the processors 16.

In certain embodiments, an input structure 14 and display 10 may be provided together, such an in the case of a touch screen where a touch sensitive mechanism is provided in conjunction with the display 10. In such embodiments, the user may select or interact with displayed interface elements via the touch sensitive mechanism. In this way, the displayed user interface may provide interactive functionality, allowing a user to select, by touch screen or other input structure, from among options displayed on the display 10.

User interaction with the input structures 14, such as to interact with a user or application interface displayed on the display 10, may generate electrical signals indicative of the user input. These input signals may be routed via suitable pathways, such as an input hub or bus, to data processing circuitry, such as the processor(s) 16, for further processing.

The processor(s) 16 may provide data processing capability to execute the operating system, programs, user and application interfaces, and any other functions of the electronic device 8. The processor(s) 16 may include one or more microprocessors, such as one or more "general-purpose" microprocessors, one or more special-purpose microprocessors and/or ASICS, or some combination of such processing components. For example, the processor 16 may include one or more reduced instruction set (RISC) processors, as well as graphics processors, video processors, audio processors and/or related chip sets.

The instructions or data to be processed by the processor(s) 16 may be stored in a memory 18. The memory 18 may be provided as a volatile memory, such as random access memory (RAM), and/or as a non-volatile memory, such as read-only memory (ROM). The memory 18 may store a variety of information and may be used for various purposes. For example, the memory 18 may store firmware executed by a processor 16 (such as basic input/output instructions or operating system instructions, including instructions implementing non-alphanumeric authentication (e.g., authentication not based on keys or characters found on a keyboard) as discussed herein), other programs that enable various functions of the electronic device 8, user interface functions, processor functions. In addition, the memory 18 and may be used for buffering or caching during operation of the electronic device 8.

The components may further include a non-volatile storage 20 for persistent storage of data and/or instructions. The non-volatile storage 20 may include flash memory, a hard drive, or any other optical, magnetic, and/or solid-state storage media. The non-volatile storage 20 may be used to store data files such as personal or business information (e.g., financial and other account information), software, wireless connection information (e.g., information that may enable the electronic device 8 to establish a wireless connection, such as a telephone or wireless network connection), and any other suitable data. In addition, the non-volatile storage 20 may also store code and/or data for implementing various functions of the electronic device 8, such as application or program code, data associated with such applications or programs, operating system code, user configured preferences, as well as code for implementing secure user authentication as discussed herein.

The embodiment illustrated in FIG. 1 may also include one or more card or expansion slots. The card slots may be configured to receive an expansion card 22 that may be used to add functionality, such as additional memory, I/O functionality, or networking capability, to the electronic device 8. Such an expansion card 22 may connect to the device through any type of suitable standard or proprietary connector, and may be accessed internally or external to the housing of the electronic device 8. For example, in one embodiment, the expansion card 22 may be flash memory card, such as a SecureDigital (SD) card, mini- or microSD, CompactFlash card, Multimedia card (MMC), or the like.

The components depicted in FIG. 1 also include a network device 24, such as a network controller or a network interface card (NIC). In one embodiment, the network device 24 may be a wireless NIC providing wireless connectivity over any 802.11 standard or any other suitable wireless networking standard. The network device 24 may allow the electronic device 8 to communicate over a network, such as a Local Area Network (LAN), Wide Area Network (WAN), cellular network, or the Internet. Further, the electronic device 8 may connect to and send or receive data with any device on the network, such as portable electronic devices, personal computers, printers, and so forth. Alternatively, in some embodiments, the electronic device 8 may not include a network device 24. In such an embodiment, a NIC may be added as an expansion card 22 to provide similar networking capability as described above.

Further, the components may also include a power source 26. In one embodiment, the power source 26 may be one or more batteries, such as a lithium-ion polymer battery. The battery may be user-removable or may be secured within the housing of the electronic device 8, and may be rechargeable. Additionally, the power source 26 may include AC power, such as provided by an electrical outlet, and the electronic device 8 may be connected to the power source 26 via a power adapter. This power adapter may also be used to recharge one or more batteries if present.

With the foregoing in mind, FIG. 2 illustrates an electronic device 8 in the form of a handheld device 30, here a cellular telephone, that may be used to store confidential personal and/or professional information and/or to execute routines to facilitate secure authentication in accessing such information or other secured features (network connections, applications, and so forth) of the device 30. It should be noted that while the depicted handheld device 30 is provided in the context of a cellular telephone, other types of handheld devices (such as media players for playing music and/or video, personal data organizers, handheld game platforms, and/or combinations of such devices) may also be suitable be provided as the electronic device 8. Further, a suitable handheld device 30 may incorporate the functionality of one or more types of devices, such as a media player, a cellular phone, a gaming platform, a personal data organizer, and so forth.

For example, in the depicted embodiment, the handheld device 30 is in the form of a cellular telephone that may provide various additional functionalities (such as the ability to take pictures, record audio and/or video, listen to music, play games, and so forth). As discussed with respect to the generalized electronic device of FIG. 1, the handheld device 30 may allow a user to connect to and communicate through the Internet or through other networks, such as local or wide area networks or cellular networks. For example, the handheld device 30 may allow a user to communicate using e-mail, text messaging, instant messaging, or other forms of electronic communication. The handheld electronic device 30, may also communicate with other devices using short-range connections, such as Bluetooth and near field communication. By way of example, the handheld device 30 may be a model of an iPod® or iPhone®, or a derivative thereof, available from Apple Inc. of Cupertino, Calif.

In the depicted embodiment, a housing 32 includes input structures 14 through which a user may interface with the device. Each input structure 14 may be configured to help control a device function when actuated. For example, in a cellular telephone implementation, one or more of the input structures 14 may be configured to invoke a "home" screen or menu to be displayed, to toggle between a sleep and a wake mode, to silence a ringer for a cell phone application, to increase or decrease a volume output, and so forth.

A display 10 of the handheld device 30 may be used to display a graphical user interface (GUI) 34 that allows a user to interact with the handheld device 30. The GUI 34 may include various layers, windows, screens, templates, or other graphical elements that may be displayed in all, or a portion, of the display 10. Generally, the GUI 34 may include graphical elements that represent applications and functions of the electronic device. The graphical elements may include icons 36 and other images representing buttons, sliders, menu bars, and the like. The icons 36 may correspond to various applications of the electronic device that may open upon selection of a respective icon 36. Furthermore, selection of an icon 36 may lead to a hierarchical navigation process, such that selection of an icon 36 leads to a screen that includes one or more additional icons or other GUI elements. The icons 36 may be selected via a touch screen provided as the display 10 in certain embodiments, or may be selected by a user input structure 14, such as a wheel or button.

In addition, the handheld device 30 may include data processing circuitry (such as one or more processors), network connectivity, memory, and storage capabilities, as described with respect to FIG. 1, which allow the handheld device 30 to store and execute the GUI or other applications suitable for implementing the present techniques. For example, the handheld device 30 may be capable of storing and executing code suitable for accessing confidential information or secured applications or network connections using gestures input via a touch screen, a sequence of user selections of displayed objects, or other non-alphanumeric (e.g., non-keyboard), non-biometric inputs. Further, to the extent that the handheld device 30 has network connectivity, such connectivity may be utilized to update or modify an existing application or GUI on the handheld device 30 to provide such functionality, i.e., to update an operating system or software application to include new or modified functionality with respect to accessing secured data, applications, or connections on electronic devices.

In addition to handheld devices 30, such as the depicted cellular telephone of FIG. 2, an electronic device 8 may also take the form of a computer or other types of electronic device on which confidential information might be stored and on which software code governing secure access to such information might be executed. Such computers may include computers that are generally portable (such as laptop, notebook, and tablet computers) as well as computers that are generally used in one place (such as conventional desktop computers, workstations and/or servers). In certain embodiments, the electronic device 8 in the form of computer may be a model of a MacBook®, MacBook® Pro, MacBook Air®, iMac®, Mac® mini, or Mac Pro® available from Apple Inc.

By way of example, an electronic device 8 in the form of a laptop computer 50 is illustrated in FIG. 3 in accordance with one embodiment. The depicted computer 50 includes a housing 52, a display 10, input structures 14, and input/output ports 12. The input structures 14 (such as a keyboard and/or a touchpad) may be used to interact with the computer 50, such as to start, control, or operate a GUI or applications running on the computer 50. For example, a keyboard and/or touchpad may allow a user to navigate a user interface or application interface displayed on the display 10. In addition, the input and output ports 12 may allow connection of additional devices. For example, the computer 50 may include an I/O port 12, such as a USB port or other port, suitable for connecting to another electronic device, such as a handheld electronic device 30.

In addition, as discussed with respect to the handheld device 30, the computer 50 may include data processing circuitry (such as one or more processors), network connectivity, memory, and storage capabilities that allow the computer 50 to store and execute a GUI and other applications suitable for implementing the present techniques. For example, the computer 50 may be capable of storing and executing programming code encoding routines suitable for accessing confidential information or secured applications or network connections using non-alphanumeric and non-biometric inputs (e.g., gestures, sequences, and so forth). Further, to the extent that a computer 50 has network connectivity, such connectivity may be utilized to update or modify an existing application on the computer 50 to provide such functionality.

With the foregoing discussion in mind, it may be appreciated that an electronic device 8 in either the form of a handheld device 30 or a computer 50 may be suitable for storing confidential information and providing user authentication via non-alphanumeric, non-biometric inputs as described herein. Though specific examples of the use of one type of electronic device or another might be described or discussed herein as storing confidential information or as providing user authentication via gesture, sequence, or other non-alphanumeric, non-biometric input, such discussion is intended as an example only and should not be construed as limiting or as indicative of a preference of one implementation over another. Instead, it should be understood that any suitable electronic device 8 (whether a portable electronic device 30, computer 50, or other type of device) capable of storing confidential information, and receiving non-alphanumeric and non-biometric inputs may be used to perform these respective functions in the various implementations described herein.

Figure 4:
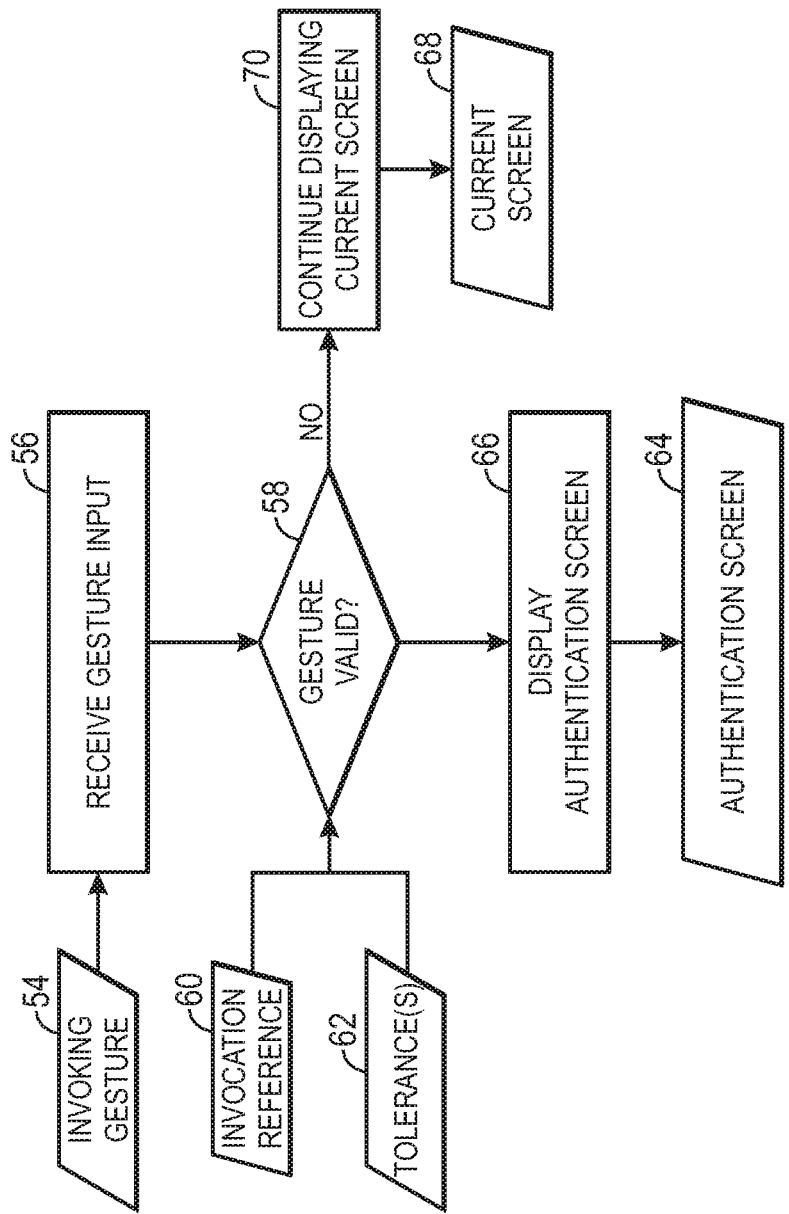
FIG. 4 is a flowchart depicting the input and validation of a gesture for invoking an authentication screen, in accordance with aspects of the present disclosure.

For example, in one implementation, code stored and/or executed on a handheld device 30 or computer 50 may be used to invoke display of an authentication screen which in turn allows a user to authenticate himself or herself and access otherwise unavailable (e.g., encrypted, hidden, and so forth) data or functions (e.g., applications or network connections). Turning to FIG. 4, a flowchart depicts representative acts, inputs, and outputs associated with one embodiment in which a gesture is employed to invoke display of an authentication screen. As depicted in FIG. 4, an invoking gesture 54 may be input to an electronic device 8.

For example, in one embodiment, the invoking gesture 54 may include a user moving one or more fingers across the surface of a touch screen to invoke an authentication routine, i.e., by making a gesture using the touch screen. As used herein, the term "gesture" can be understood to encompass the movement of one or more fingers across or along a touch-sensitive structure, such as to move along a path, draw a pattern or shape, move a displayed virtual object, and so forth. The term "gesture" can therefore be understood to be distinct from the simple act of touching the touch-sensitive structure, such as a touch screen or touch pad, at a single point or without movement along the surface of the touch sensitive structure, as may occur when a button, icon, or object is typically selected using a touch-sensitive structure. Thus, as implemented as an input to an electronic device 8, a gesture may be described by a sequence of locations (e.g., a series of coordinates) input via a user touching a touch-sensitive structure. As discussed herein such a sequence of locations may include more than one location being input at the same time, i.e., more than one finger might be involved in making a gesture on the touch-sensitive structure at any given time.

Further, a sequence of locations may be defined not only by location in space, i.e., where the contact is occurring, but by respective timing, i.e., when the contact or movement is occurring. In this way, the velocity or acceleration of the finger or fingers on the touch-sensitive structure or the addition or removal of fingers involved in the gesture at a particular point in time may define the gesture. Likewise, in certain embodiments, pauses may be incorporated into the gesture such that a gesture is evaluated based on whether the pauses are present at particular times when tracing the gesture.

Thus, as an input, a gesture may be understood to encompass sequential locations or positions (e.g., coordinates) identified by the movement of a finger or fingers on a touch-sensitive structure. The input associated with such a gesture may also include a temporal component that may be evaluated separately from the spatial component (i.e., the movement of a second finger is included or removed from the gesture movement at a particular point in time) or may be evaluated in conjunction with the spatial component (i.e., the velocity and/or acceleration of the finger when moving across the touch-sensitive structure may constitute part of the gesture).

In addition, an input associated with a gesture may be further characterized by other factors. For example, the distance traveled by a finger in making a gesture may be a factor used to characterize the gesture. That is, two different gestures may begin and end at the same points on a touch-sensitive structure but may travel different paths of different lengths in moving between the otherwise identical beginning and ending locations. In such a context, the actual path traced or the distance traveled may be used to characterize the gesture. Likewise, the direction of a movement may be used to characterize a gesture. For example, a clockwise circular motion and a counterclockwise circular motion may start and stop at the same locations and may involve a movement of the same distance. However, such complementary movements may be distinguished based on the directionality of the motion in addition to the actual path traveled.

With the foregoing in mind and as depicted in FIG. 4, an invoking gesture 54 may be received (block 56) as a gesture input by an electronic device 8 or processor 16 of such a device (FIG. 1). In one embodiment, the invoking gesture 54 is received via a touch screen or touch pad of the device 8 even though no prompt or selection for the gesture is displayed on the device 8. That is, in such an embodiment, the device 8 does not display any indication of that an authentication screen may be invoked at the time the invoking gesture 54 is received. Indeed, in some embodiments, prior to receipt of the invoking gesture 54 and subsequent user authentication, there may be no indication on the device 8 that data and/or applications secured by an authentication protocol, as discussed herein, is present on the device 8.

The invoking gesture 54 may then be evaluated (block 58), such as by suitable code executing on a processor 16, to determine whether or not the gesture 54 is valid. For example, in an embodiment where encryption is not performed, the invoking gesture 54 may be compared with an invocation reference 60 (e.g., a reference gesture) stored on the device 8. The invocation reference 60 may be preconfigured on the device 8 and may not be changed by the user in one embodiment. However, in another embodiment, the user may enter and confirm the invocation reference 60 on the device 8 as part of configuring one or more security features on the device 8. In other embodiments where encryption and cryptographic keys are utilized, the invoking gesture 54 may be converted to a cryptographic key (as discussed herein below) that may be compared to the invocation reference 60 (e.g. a stored cryptographic key, hash, or portion of a key pair) in allowing the user to proceed in the authentication process. In this disclosure, the term "invoking gesture" may refer to both a gesture converted to a cryptographic key or to a gesture persisted in a manner that allows it to be compared to other gestures or references.

The comparison of the invoking gesture 54 with the invocation reference 60 may take into account one or more tolerance or threshold criteria 62 that allow for validation of the invoking gesture 54 when the invoking gesture 54 is not an identical match (spatially and/or temporally) with the invocation reference 60. For example, the tolerances 62 may allow validation of the invoking gesture 54 if the invoking gesture 54 (or some portion of the invoking gesture 54) is deemed to be sufficiently similar to the invocation reference 60. For example, if some percentage (e.g. 50%, 75%, 85%, 90%, or 95%) of the coordinates input as the invoking gesture 54 overlap with or are identical to the stored coordinates of the invocation reference 60, the invoking gesture 54 may be deemed valid. In another implementation, if the coordinates or locations associated with the invoking gesture 54 are within some threshold (such as 10%, 20%, 25%, and so forth) distance or time from the corresponding coordinates or locations of the invocation reference 60, the invoking gesture 54 may be deemed valid. In an implementation where the invoking gesture 54 is converted to an encryption key, the tolerances 62 may be implemented to allow sufficiently close coordinates or positions to be treated as the same coordinate or position (such as by rounding to the nearest whole number coordinate position) prior to submission to a hash algorithm or other encryption algorithm. Regardless of the mechanism by which the tolerance 62 is implemented, in some embodiments the validation process provides allows for validation of the invoking gesture 54 even when the invoking gesture 54 is not identical to the stored reference 60.

Further, in some embodiments, different degrees or ranges of tolerance 62 may be allowed, such as for invoking different authentication screens or routines associated with different types of confidential access. Alternatively, the tolerance 62 may vary based on some characteristic of the invocation reference 60, such as an estimated complexity or length. For example, an invocation reference 60 determined to be highly complex might be afforded greater tolerance for validation than an invocation reference 60 determined to be simple. Thus swiping a single finger from one corner of a touch screen to a diametrically oppose corner with no consideration for the speed of the finger swipe may be deemed to be a simple gesture and may be afforded little or no tolerance 62 when validating an invoking gesture 54. Conversely, a gesture involving multiple fingers that includes temporal components and no fixed reference points may be deemed to be highly complex and may be afforded greater tolerance 62 with respect to the spatial and/or temporal components.

If the invoking gesture 54 is determined to be valid at block 58, an authentication screen 64 maybe displayed (block 66) for subsequent input of a user authentication. However, if the invoking gesture 54 is not determined to be valid at block 58, the current screen 68 may continue to be displayed (block 70). In one embodiment, if the invoking gesture is not validated, the current screen 68 remains on display with no indication that any attempt was made to invoke an authentication screen 64. In such an embodiment, a bystander may see nothing more than that a user touched a screen of the device 8, with no other indication that any validation event was attempted and failed. Likewise, an unauthorized user in possession of the device 8 would not see that gestures made on a touch screen of the device 8 were being evaluated and would, therefore, not be encouraged to continue making such gestures.

Figure 5:
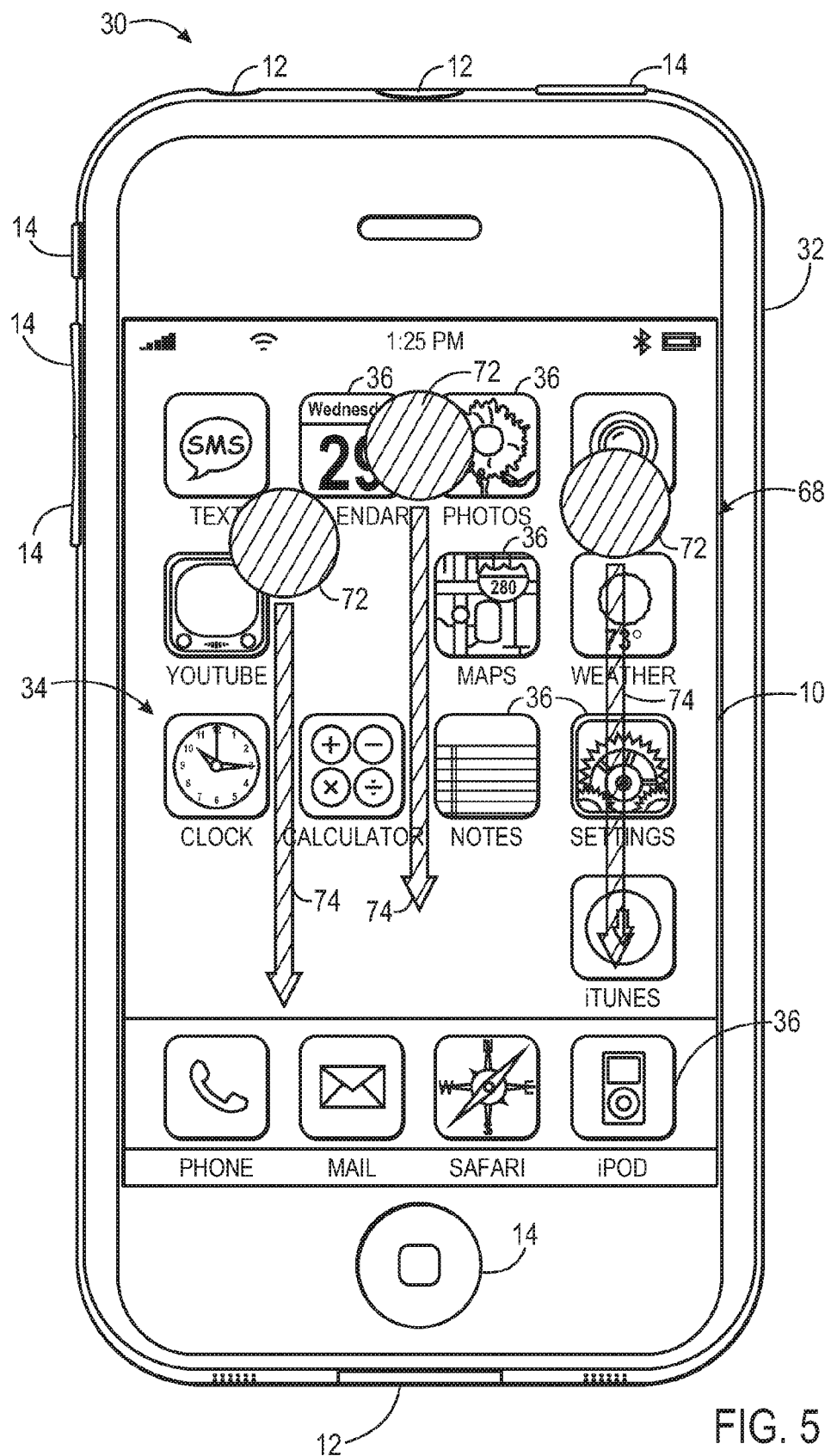
FIG. 5 is a view of an interface screen of a handheld device on which an authentication invoking gestures is being performed in accordance with aspects of the present disclosure.

With the foregoing in mind and turning to FIG. 5, one example of an implementation of an invoking gesture 54 is depicted with respect to a handheld device 30 having a display 10 which is a touch screen. In this example, a user may rest three fingertips on a current screen 68, as depicted by contact points 72, and may swipe the fingertips down the touch screen, as depicted by directional arrows 74. In so doing, the user (if the invoking gesture is accepted) invokes the subsequent execution of an authentication routine or application. As will be appreciated other numbers of fingers or other gestures may also be used to perform the invoking gesture. For example, a user might instead use one or more fingers to draw a shape (e.g., a circle, square, triangle, etc.) or other recognizable shape to invoke the authentication routine. In some embodiments the number of fingers or the invoking gesture may be configurable by the user. As will be appreciated, though a touch screen embodiment is depicted, such an invoking gesture may be used with any touch-sensitive input device, such as a touchpad or similar structure typically found on a portable computer 50.

As discussed above, the authentication routine may be invoked, such as by the depicted invoking gesture, despite the current screen 68 not displaying any reference to the authentication routine or to information or resources accessible after successful authentication. That is, the invocation of the authentication routine need not be the result of selecting an icon or option displayed on the current screen 68, but may instead be predicated on recognition of the invoking gesture. Therefore, the existence of the authentication routine and/or the resources accessed by the authentication routine may be hidden from view when viewing the current screen 68.

As will be appreciated, in such embodiments the current screen 68 may be a screen of an overall device user interface (as depicted in FIG. 5) or may be an application interface screen for an application that performs functions or accesses data for which authentication is requested. For example, the current screen 68 may be a screen of an E-Wallet or banking application where some functions or data are encrypted or have restricted access. Regardless of the nature of the current screen 68, in certain embodiments the current screen 68 does not display a visible prompt or option to invoke user authentication. In such implementations, the gesture may be recognized by a routine or process associated with the operating system for the device 30 or an application running on the device 30 which runs in the background with no visible indication of its operation.

Figure 6:
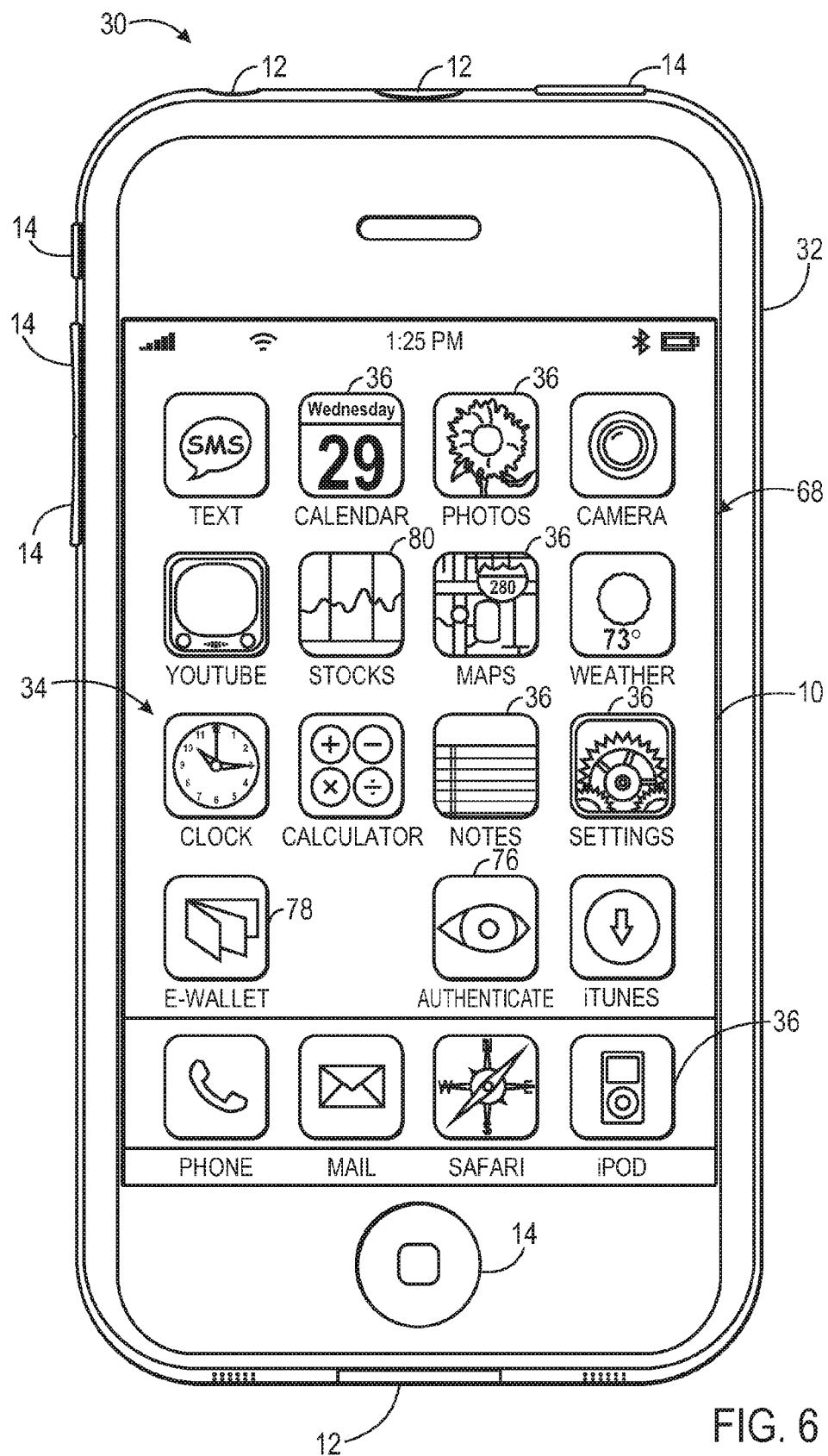
FIG. 6 is a view of an interface screen of a handheld device on which an authentication option is provided in accordance with aspects of the present disclosure.

In other embodiments, the authentication routine may be invoked by a displayed Authentication icon 76 (FIG. 6) and/or by selection of an icon or function for which access is controlled or which utilizes confidential data, such as E-Wallet icon 78 or Stocks icon 80. In such embodiments, the existence of the data or resource may be visible on the current screen 68 so that a bystander might recognize the existence of the function or data, but may not be able to access such controlled content without invoking and successfully passing user authentication.

In one embodiment, successful user authentication may have a global or semi-global effect on the device such that, prior to successful user authentication, resources, data, or applications requiring user authentication (such as the E-Wallet icon 78 or Stocks icon 80) are not displayed (as depicted in FIG. 5), but after successful authentication such resources, data or applications are displayed. For example, in one embodiment accessing an E-wallet application before user authentication displays a single account while any additional accounts are hidden or remain encrypted. After successful authentication, however, all accounts in the E-wallet application may be displayed. Alternatively, authentication may be limited to specific data or functions, i.e., successful authentication may only decrypt or make available a particular set of data or particular function for which user authentication was performed, with other restricted content remaining inaccessible absent additional user authentications.

Figure 7:
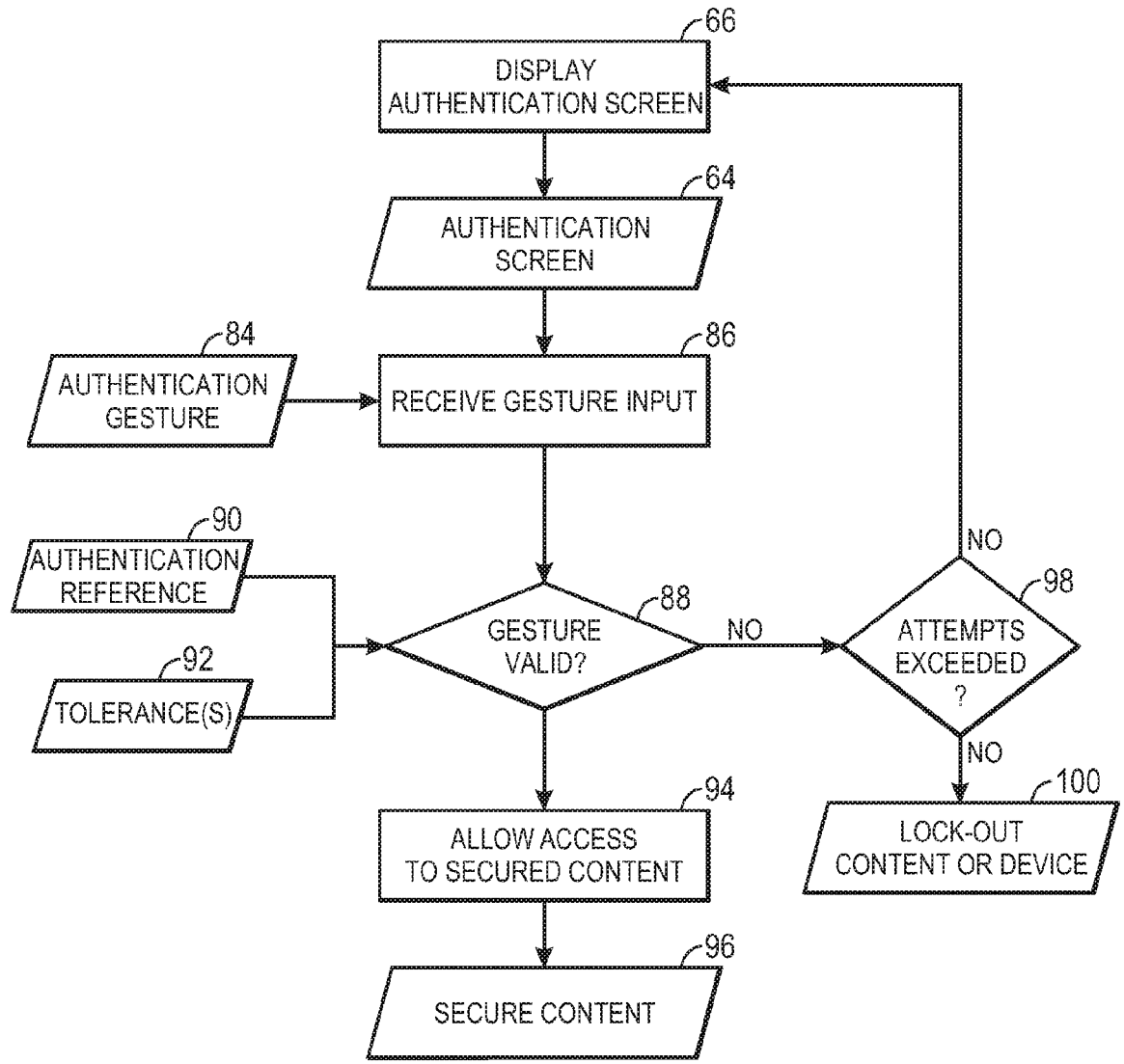
FIG. 7 is a flowchart depicting the input and validation of a gesture for authenticating a user, in accordance with aspects of the present disclosure.

The preceding describes various ways in which user authentication may be invoked. Turning now to FIG. 7, a flowchart depicts representative acts, inputs, and outputs associated with one embodiment in which a gesture is employed to authenticate a user. As depicted in FIG. 7, an authentication screen 64 may be displayed (block 66), such as due to a user invoking such an authentication screen, as discussed above. In one embodiment, the authentication screen 64 may include a visual aid or guide with which a user may interact (either directly, such as on a touch screen, or indirectly, such as via touch pad) to input an authentication gesture 84 to an electronic device 8.

As depicted in FIG. 7, the authentication gesture 84 may be received (block 86) as a gesture input by an electronic device 8 or processor 16 of such a device (FIG. 1). In one implementation the authentication gesture 84 may be converted to a cryptographic key. In one such embodiment, when inputting the authentication gesture 84 for the first time, the user interface communicates the significant elements of the gesture to the user. For example, the proximity of an icon to other icons as the icon is moved by the user around the screen, may be significant to the gesture. For example, the user interface may change the color of two icons (or otherwise provide a visual indication) whenever the user moves the icons in a way that causes them to collide. The underlying code, which converts the gesture to a cryptographic key or other digital reference, would, in this example, deem the collisions significant to the semantics of the gesture. As another example, a gesture algorithm may deem significant to the gesture semantics the collision of multiple icons in combination with the distance the icons travel. Or, a gesture algorithm may deem significant to the gesture semantics the sequence of colors of icons that are tapped or dragged by the end user.

In the case where the authentication gesture 84 is or is translated into a cryptographic key, a sufficiently strong gesture can make it technically infeasible to recover the data on the device via "brute force" (i.e., without entering the gesture.) This characteristic, combined with gesture algorithms that can provide a population of possible decryption values that, with respect to the size of the population, grows exponentially faster than traditional PIN numbers, may provide an authentication scheme that is less vulnerable to attacks than alphanumeric passwords that are often derived from dictionary words. In other words, such authentication gestures 84 can yield a high degree of entropy that is often difficult to achieve with traditional PINs and alphanumeric passcodes.

The user interface, including how spatial and temporal tolerances are communicated to the end user during gesture origination and subsequent input, helps define the tolerances inherent to the authentication gesture 84. Authentication gestures 84 with greater tolerances will be easier to consistently enter but less secure, while those with lower tolerances will be more difficult to consistently enter but more secure. Depending on the user, and in particular the user's skill with the input device and the user's ability to repeat gestures with a high degree of consistency, gesture algorithms may be chosen to yield a good match between the difficulty of guessing a gesture with the ease of entering a known gesture.

The authentication gesture 84, once input as part of an authentication process, may be evaluated (block 88), such as by suitable code executing on a processor 16, to determine whether or not the authentication gesture 84 is valid. In one implementation the authentication gesture 84 may be converted to a cryptographic key (e.g., a hash, key, or portion of a key pair) as part of the authentication process. In such implementations, the cryptographic key may be used to decrypt encrypted data on the electronic device 8, thereby making such data available to a user of the device 8. In this disclosure, the term "authentication gesture" may refer to both a gesture converted to a cryptographic key or to a gesture persisted in a manner that allows it to be compared to other gestures or references In one embodiment, the authentication gesture 84 (or a cryptographic key generated based upon the authentication gesture 84) may be compared with an authentication reference 90 stored on the device 8. The authentication reference 90 may be preconfigured on the device 8 and may not be changed by the user in one embodiment. However, in another embodiment, the user may enter and confirm the authentication reference 90 on the device 8 as part of configuring one or more security features on the device 8.

As discussed with respect to the use of invoking gestures, the comparison of the authentication gesture 84 with the authentication reference 90 may be performed in such a way that absolute equivalence of the authentication gesture 84 with the authentication reference 90 is not required to establish the authenticity of the user. For example, as discussed above, the comparison of the authentication gesture 84 with the authentication reference 90 may take into account one or more tolerance or threshold criteria 92 that allow for validation of the authentication gesture 84 even when the authentication gesture 84 is not an identical match (spatially and/or temporally) with the authentication reference 90. That is, the tolerances 92 may allow validation of the authentication gesture 84 if the authentication gesture 84 (or some portion of the authentication gesture 84) is determined to be sufficiently similar (e.g., within some quantitative or qualitative threshold of deviation) to the authentication reference 90.

Further, as previously discussed, in some embodiments, different degrees or ranges of tolerance 92 may be allowed, such as for providing access to different secured content or functions. For example validation of an authentication gesture that allows access to bank account or credit card information may be given less tolerance than a comparable validation of an authentication gesture that allows access to a wireless network connection. Alternatively, the tolerance 92 may vary based on some characteristic of the authentication reference 90, such as an estimated complexity or length. For example, as previously discussed, authentication references 90 determined to be highly complex might be afforded greater tolerance for validation than authentication reference determined to be simple.

If the authentication gesture 84 is determined to be valid at block 88, a user may be granted access (block 94) to view or use previously secure content 96, e.g., encrypted or hidden data or functions (applications, network connections, and so forth). However, if the authentication gesture 84 is not determined to be valid at block 88, the secure content 96 remains unavailable or invisible to the user. In one embodiment, failure to validate an authentication gesture 84 may cause a subsequent determination (block 98) of whether a set number of allowed authentication attempts (such as three or five) has been exceeded. If the set number of allowed attempts has been exceeded, the device 8 may be inactivated (block 100) or no additional attempts at authentication may be allowed for a set time period or pending a reset of the security parameters. However, if the set number of allowed attempts has not been exceeded, authentication screen 64 may continue to be displayed (block 66), thereby allowing the user another attempt to successfully enter the proper authentication gesture 84.

Figure 8:
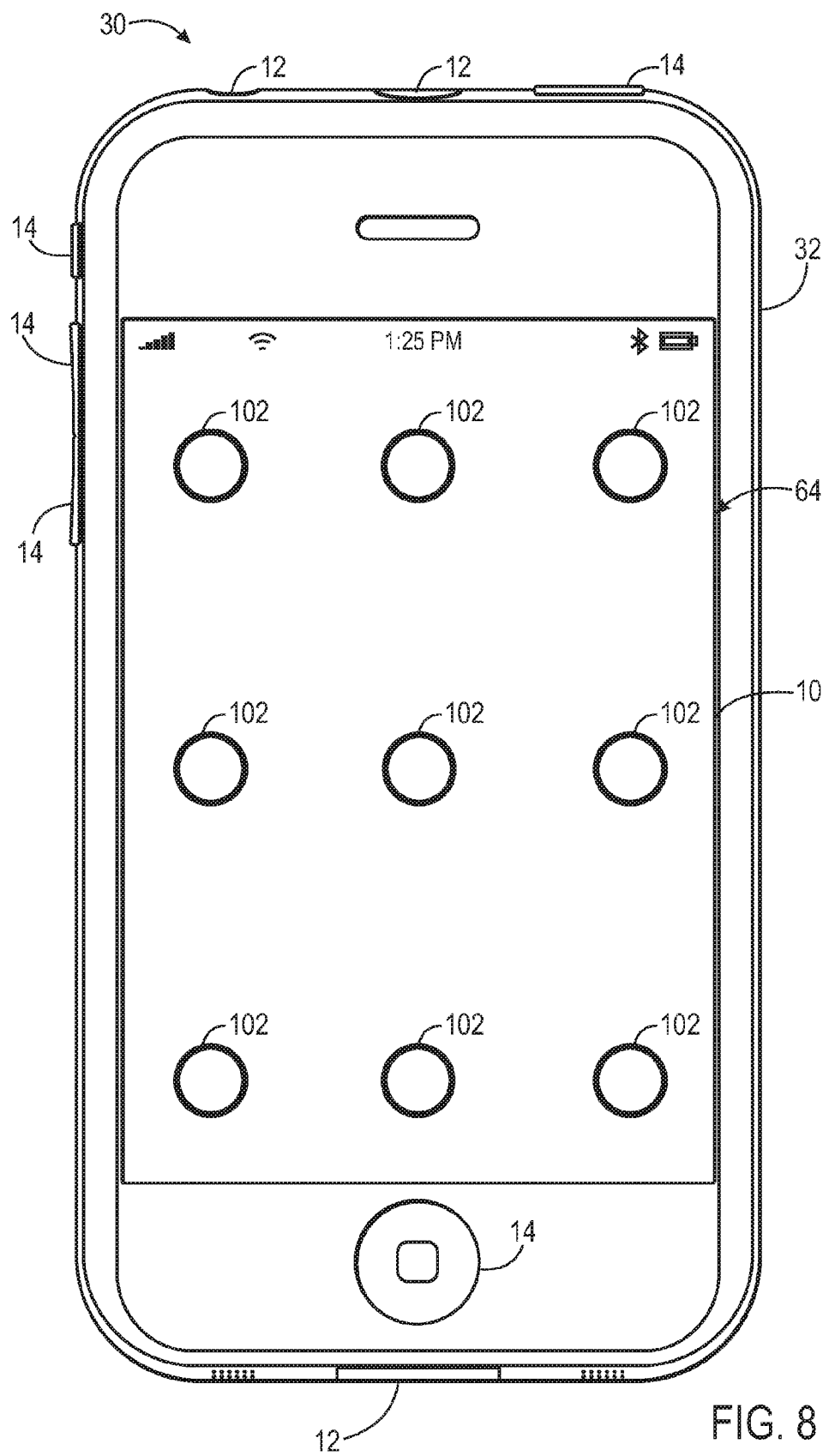
FIG. 8 is a view of a gesture entry screen in accordance with aspects of the present disclosure.

With the foregoing in mind and turning to FIG. 8, one example of an implementation of an authentication screen 64 for use with a gesture is depicted with respect to a handheld device 30 having a display 10 which is a touch screen. In this example, an authentication screen 64 is displayed that has nine spaced apart touch spots 102 which serve as initiation and destination locations for user authentication gestures. As will be appreciated, though the depicted example employs touch spots that are circular in shape, other shapes of touch spots (such as triangular, square, star-shaped, and so forth) suitable for marking a location on the display 10 may be employed. Likewise, though a 3×3 grid is depicted, other sizes and shapes of grids of touch spots 102 may be displayed, e.g., 2×2, 2×3, 3×4, 4×4, 5×5, and so forth. Further, the size of the touch spots 102 may vary in different implementations to represent the tolerance and/or precision associated with the gesture, e.g., larger touch spots 102 may be associated with greater tolerance in evaluating a gesture or vice versa.

A user authentication gesture 84 might begin and end at any one of the touch spots 102, including beginning and ending at the same spot (such as by using a small circular gesture or other gesture that returns to the initial touch spot). As discussed above, the path a finger travels between one or more of the spots may constitute a gesture evaluated to authenticate a user.

Further, in certain embodiments, the speed at which all or part of the gesture is executed, i.e., the speed at which the path or paths are traveled between touch spots, may constitute part of the gesture which is evaluated, i.e., the gesture may be authenticated if performed at a certain speed or if parts of the gesture are performed at one speed while other parts of the gesture are performed at a different speed. In such an embodiment, a color or visual indicator may be displayed on the screen (such as a colored circle or trail centered on the moving fingertip) which changes color, shading or hatching based on the speed of the fingertip motion.

Figure 9:
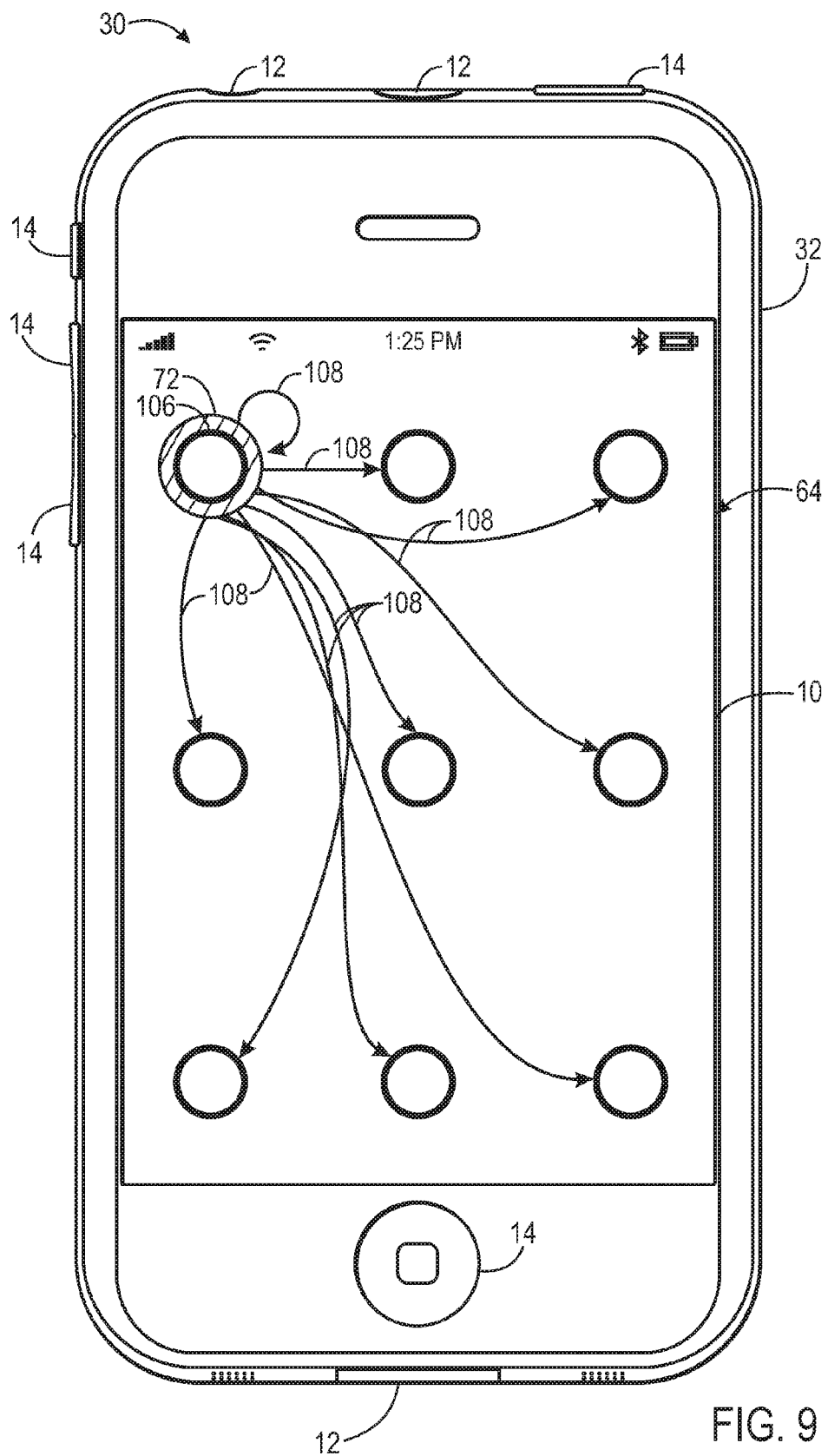
FIGS. 9-11 depict entry of a gesture on the screen of FIG. 8 in accordance with aspects of the present disclosure.

Turning to FIG. 9, an example is depicted in which the user has begun a gesture at first touch spot 106, as shown by finger contact point 72 overlying the first touch spot 106. As indicated by directional arrows 108, the user may perform all or part of an authentication gesture by moving his finger, while in contact with the touch screen display 10, to any of the touch spots, including the first touch spot 106. Thus, in the depicted example a simple authentication gesture from a first touch spot to a second touch spot yields 81 possible combinations (i.e., 9×9). Each additional touch point added to the authentication gesture increases the number of possible combinations by a factor of 9, i.e., an authentication gesture moving from a first to a second to a third touch point would have 729 combinations, while a fourth touch point would yield 6,561 combinations, and so forth.

Figure 10:
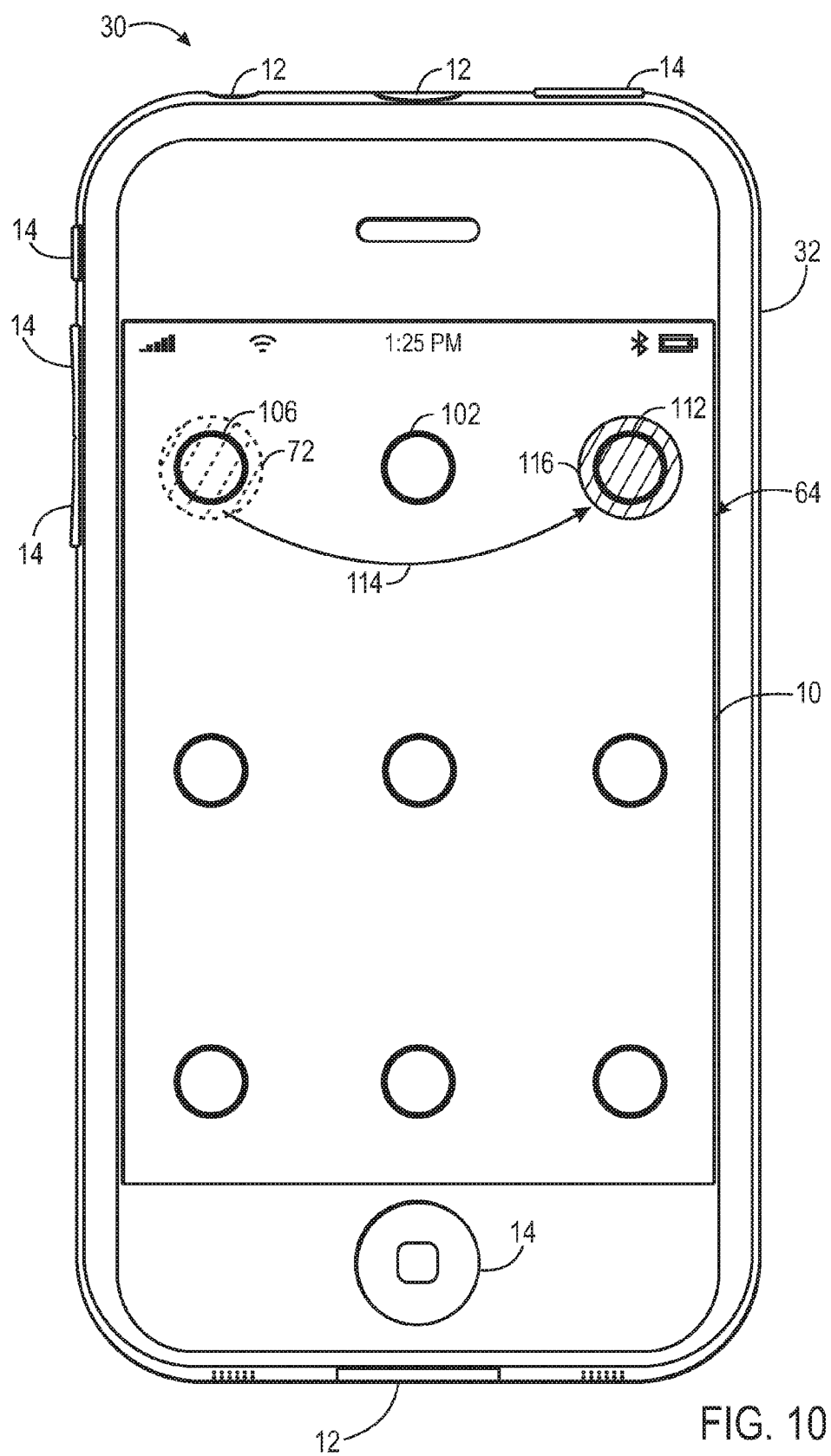
Figure 11:
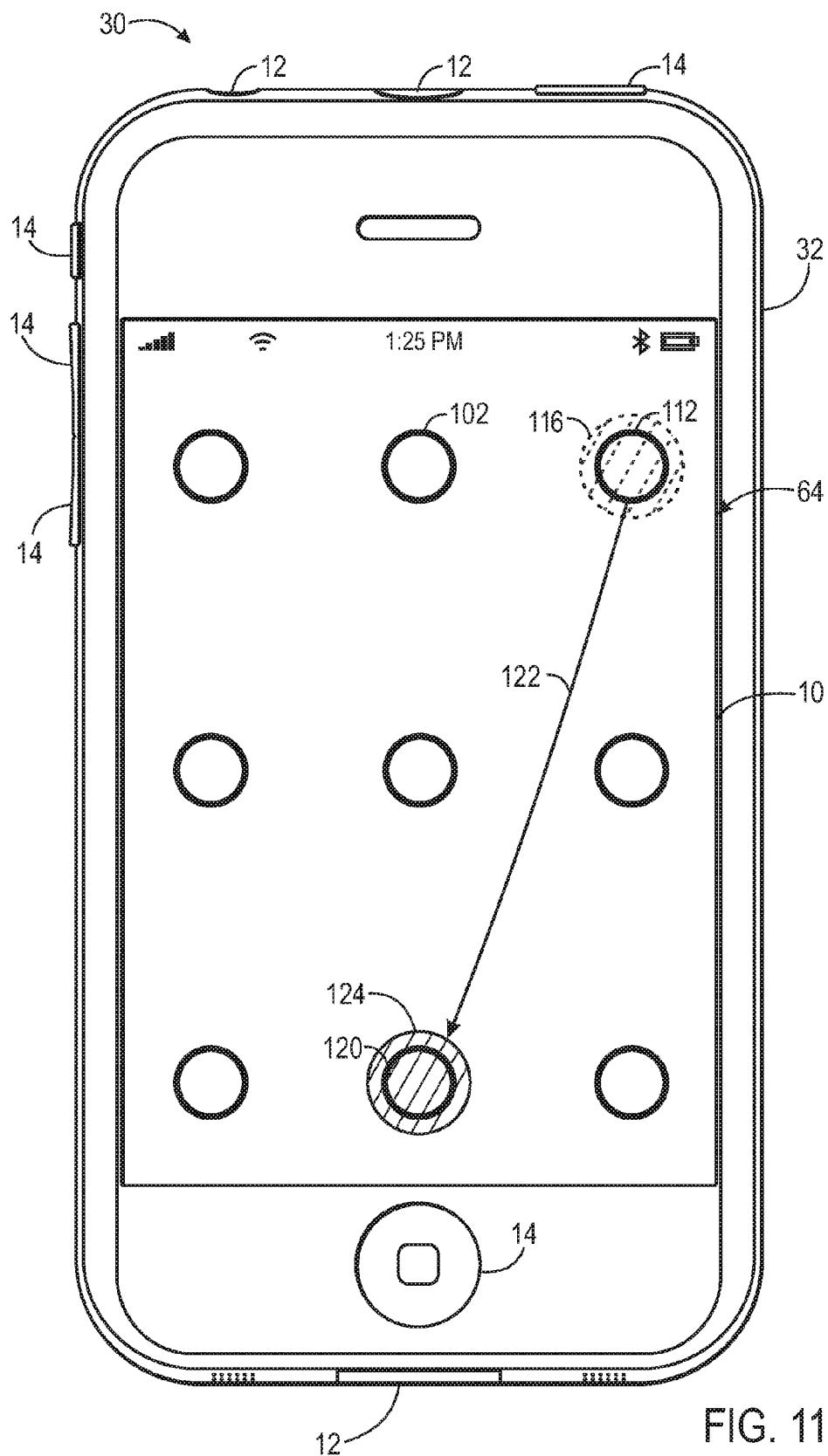

By way of further example, FIGS. 10 and 11 depict the second and third stages of a three-part authentication gesture based on the initial finger contact depicted in FIG. 9. As depicted in FIG. 10, the finger may be moved while in contact with the touch screen display 10 at the first touch spot 106 to a second touch spot 112, as depicted by directional arrow 114 and finger contact spot 116. Subsequently, as depicted in FIG. 11, the finger may be moved while in contact with the touch screen from above the second touch spot 112 to a third touch spot 120, as depicted by directional arrow 122 and finger contact spot 124. Such a three-stage authentication gesture would represent one of the 729 possible three-stage gestures.

Figure 12:
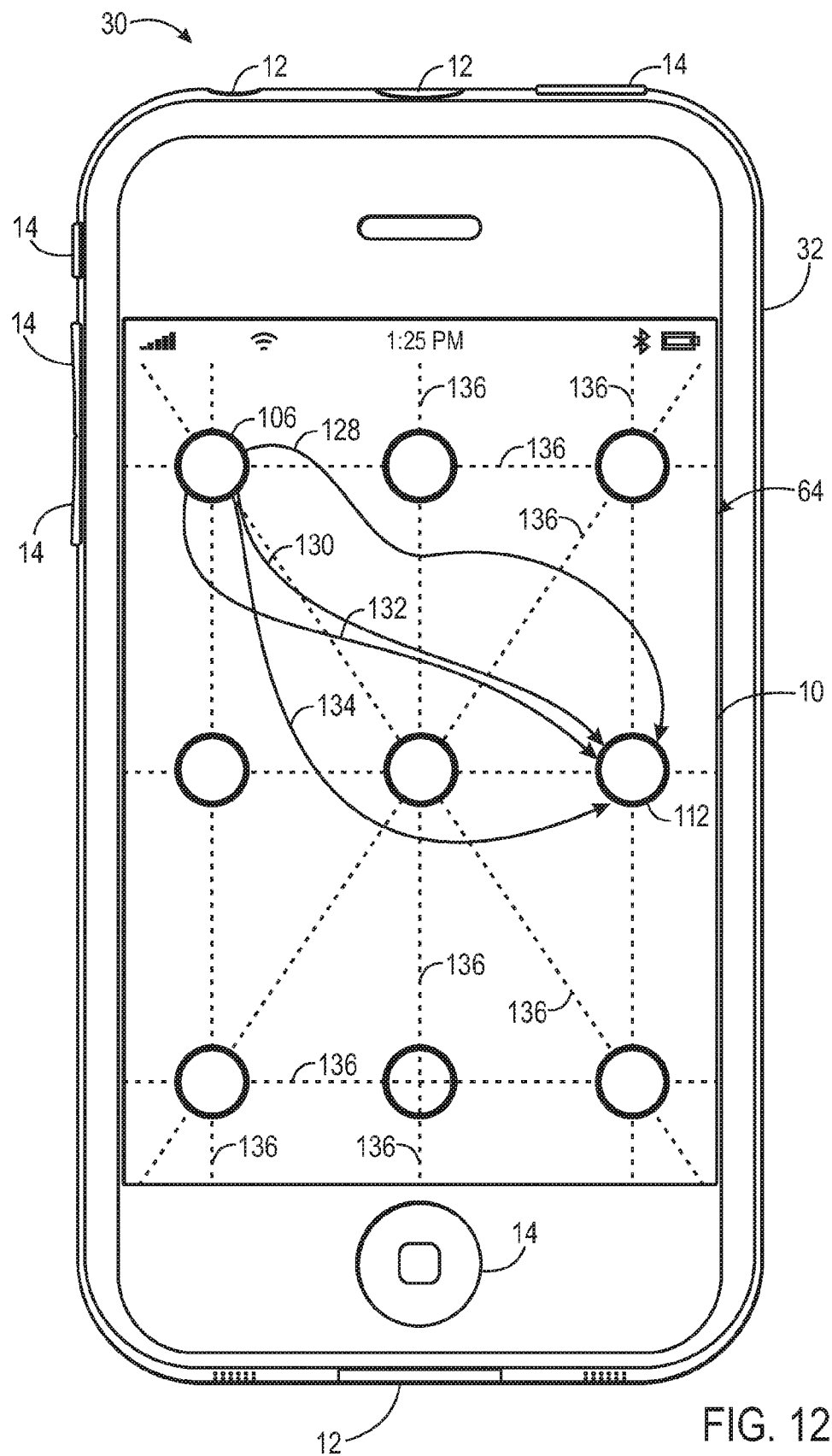
FIG. 12 depicts alternative paths used to make a gesture on the screen of FIG. 8 in accordance with aspects of the present disclosure.
Figure 13:
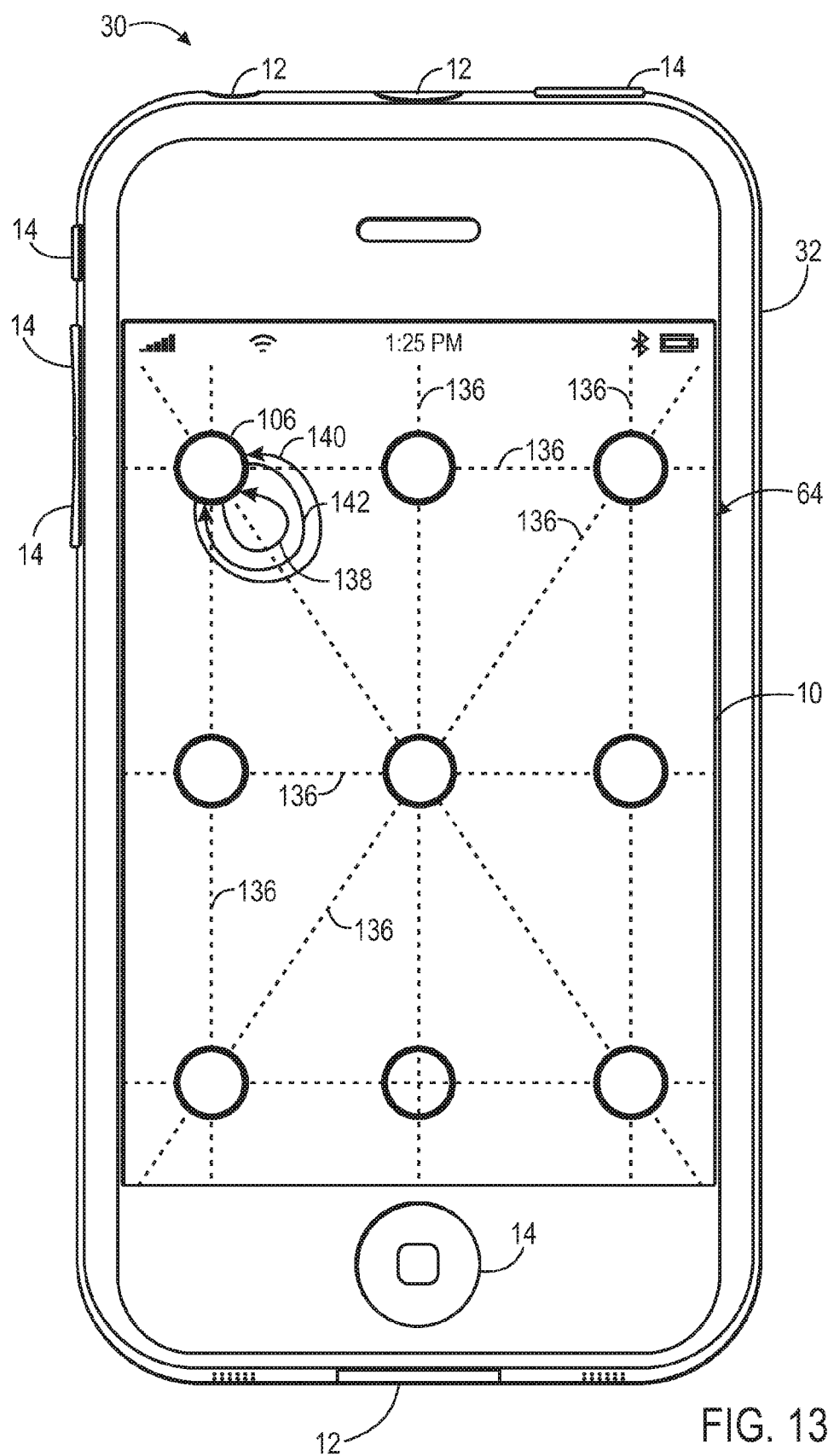
FIG. 13 depicts another set of alternative paths used to make a gesture on the screen of FIG. 8 in accordance with aspects of the present disclosure.

However, in certain embodiments the number of possible combinations may be even higher if it is considered that connecting two touch spots may be accomplished with different gestures, i.e., by tracing different paths between the touch spots. For example, referring now to FIG. 12, a variety of different paths 128, 130, 132, and 134 are depicted which may be traveled in moving a finger from firth touch spot 106 to second touch spot 112. In one embodiment, the different paths 128, 130, 132, and 134 may each be characterized by which planes 136 they cross, where the planes 136 are defined as horizontal, vertical, and/or diagonal lines (which may or may not be displayed) connecting the touch spots 102. Thus, which planes 136 are crossed by a path and the order in which they are crossed may be used to define a gesture so that it can be evaluated during by an authentication routine. Likewise, turning to FIG. 13, even when a gesture simply returns to a single touch spot, here first touch spot 106, the gesture may cross different planes or may cross the same planes in different orders, as depicted by paths 138, 140, 142. Thus, in such embodiments, more than one gesture may be generated to connect two touch spots or even a single touch spot. As a result, in such an embodiment, more than nine possibilities may exist for each stage of a gesture beyond the initial selection of a touch spot. However, as discussed above, in other embodiments a gesture may be evaluated based on no more than at which touch spots the various parts or stages of a gesture begin and end, without regard to the path traced (or planes crossed) between the touch spots.

Figure 14:
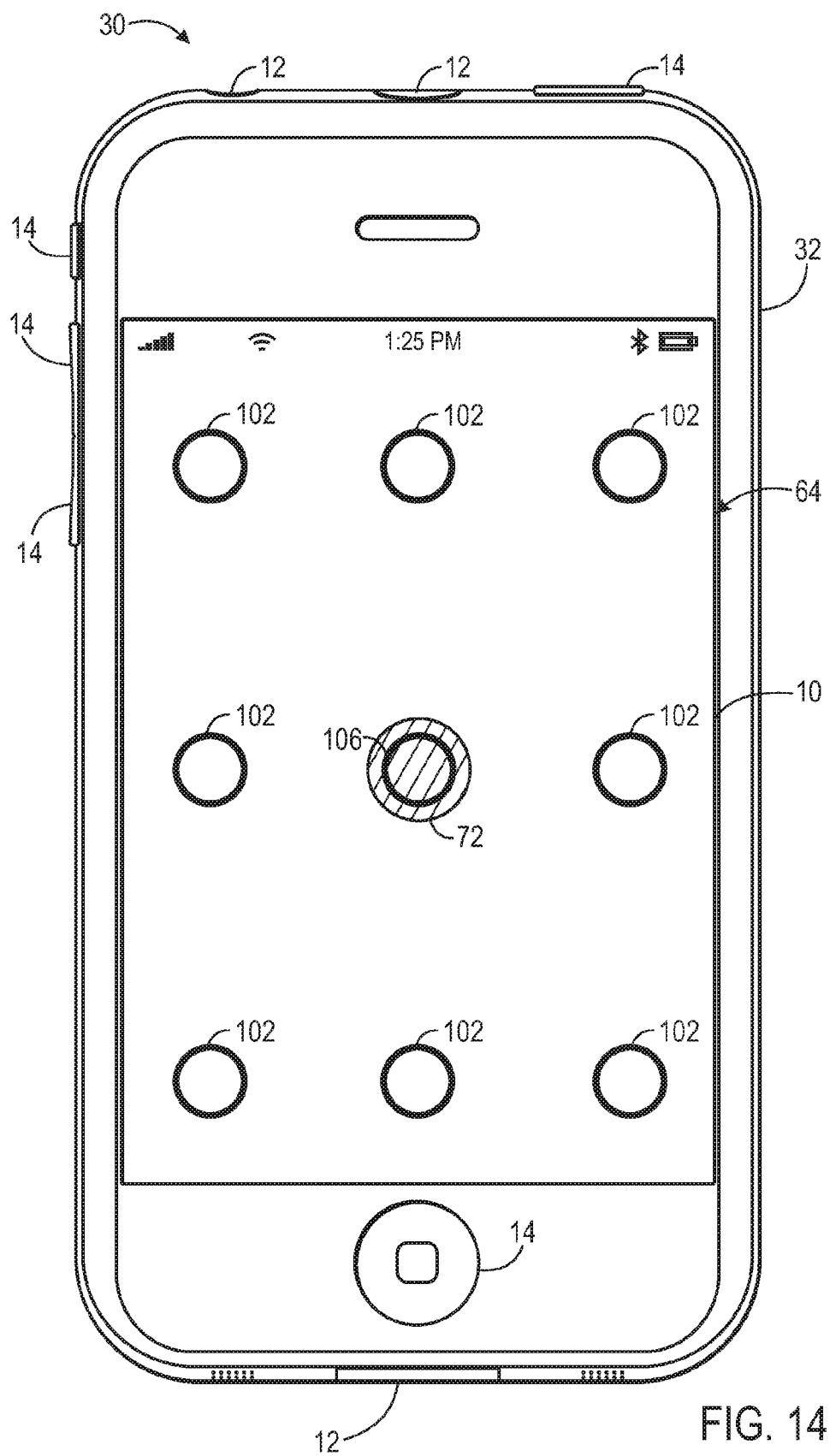
FIG. 14-17 depict entry of a multi-touch gesture on the screen of FIG. 8 in accordance with aspects of the present disclosure.
Figure 15:
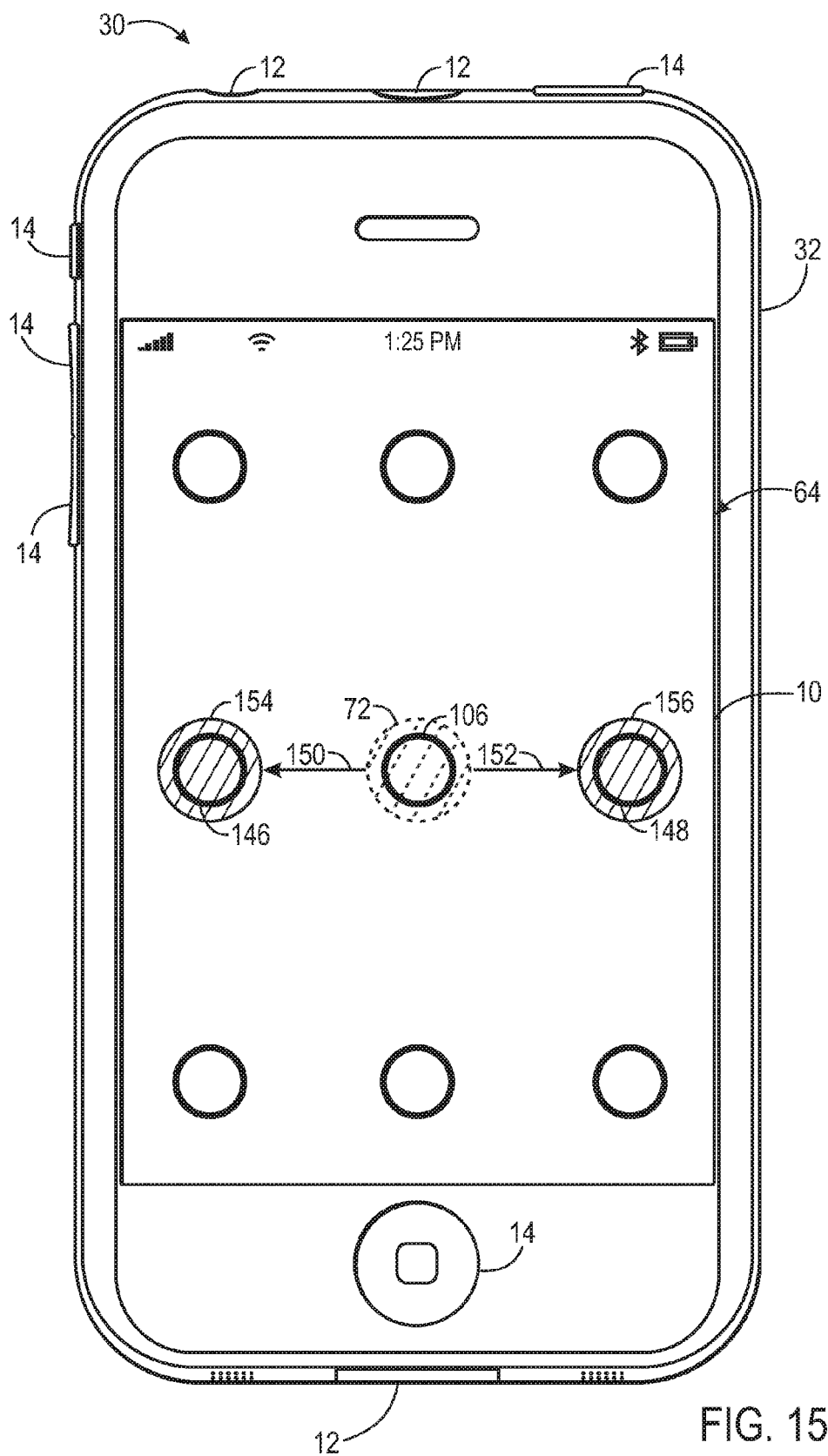
Figure 16:
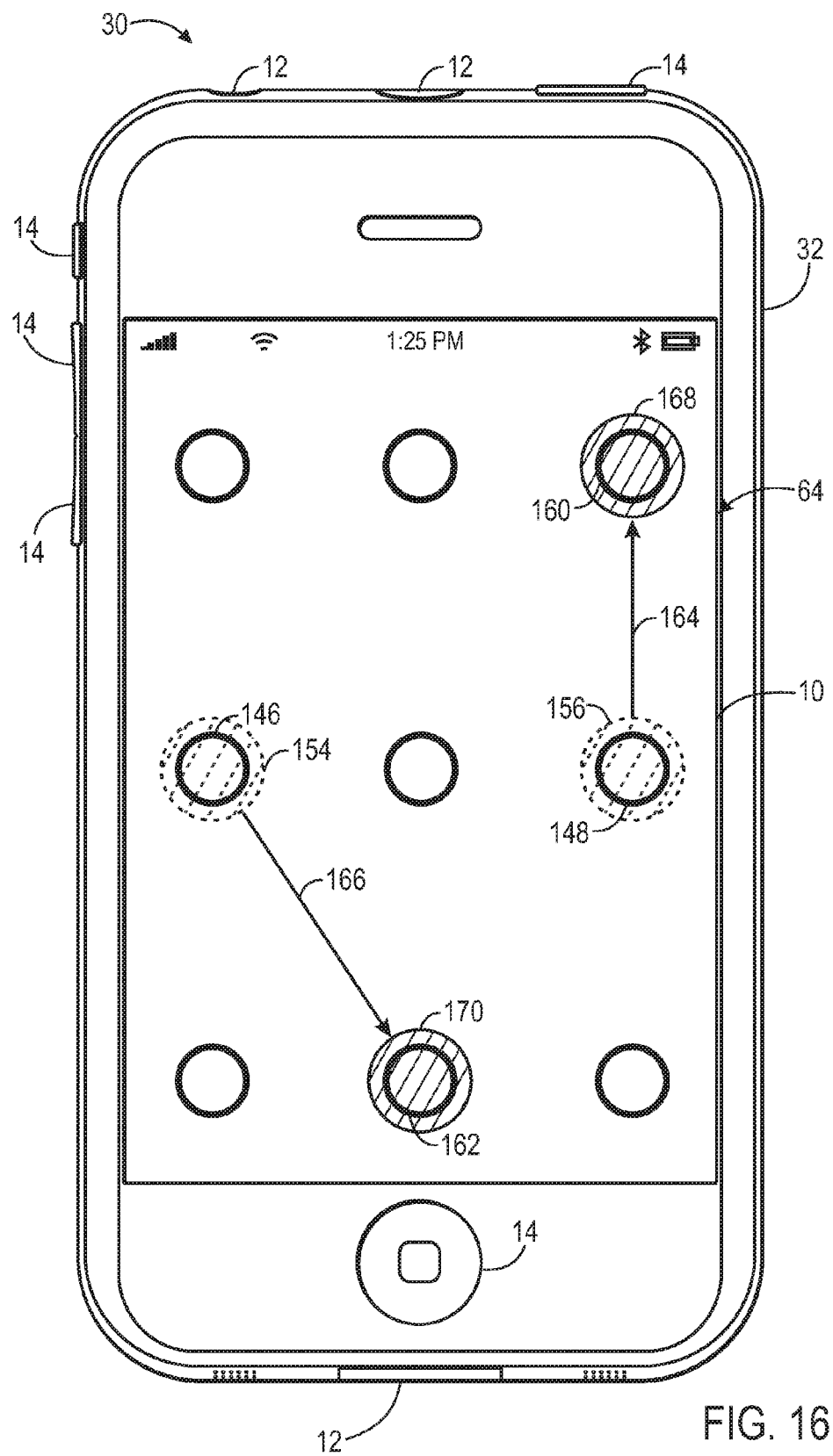
Figure 17:
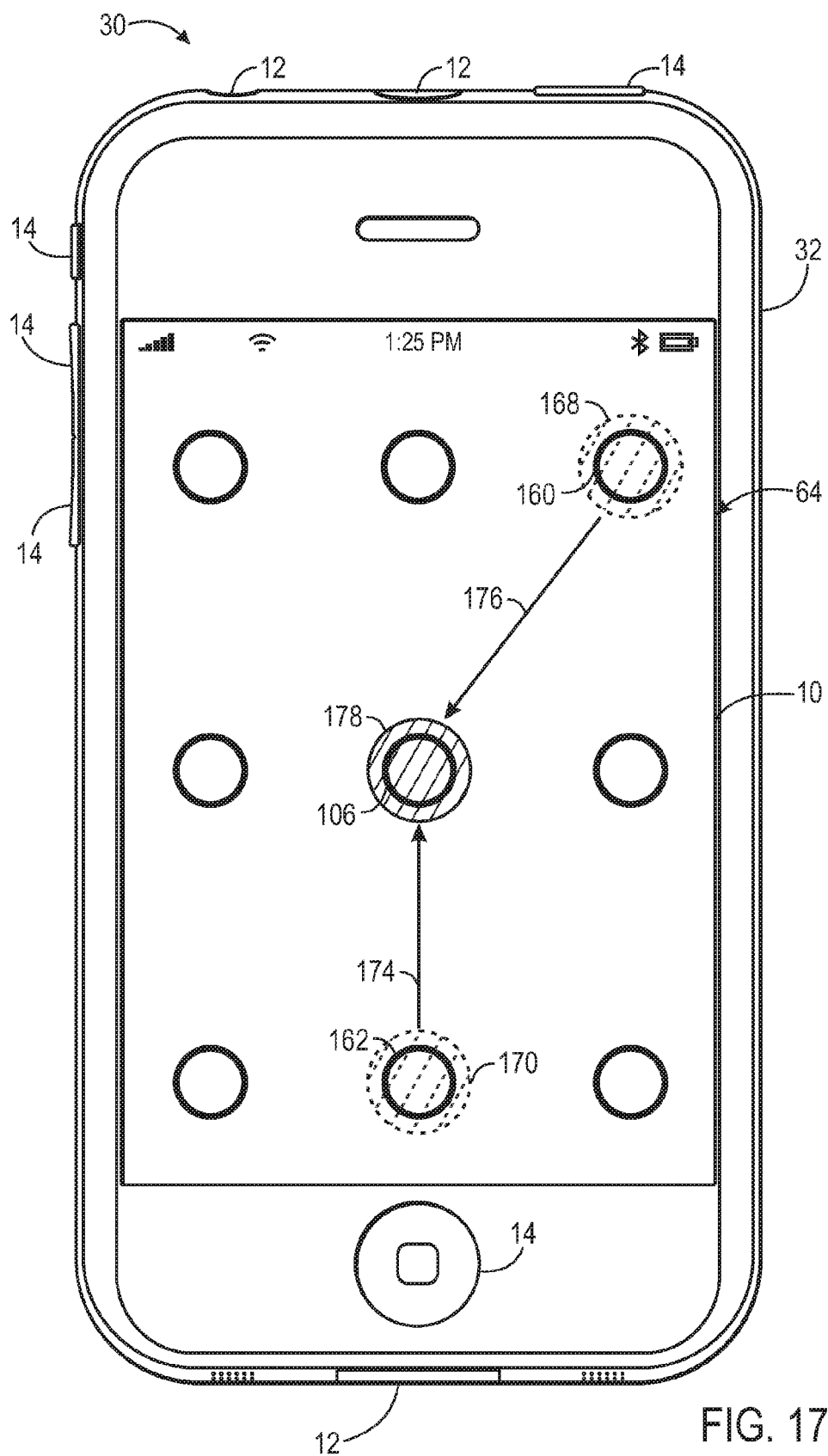

Further, complexity of the authentication gesture, and corresponding security, may be increased by allowing multi-touch gestures in which more than two (or more) fingers are employed simultaneously, allowing more than one finger contact point at a time on the touch screen display. Such multiple contact points may be split or merged based on the authentication gesture. For example, turning now to FIGS. 14-17, a finger and thumb may be initially pinched together to form a single initial contact point 72 above a first touch spot 106, as depicted in FIG. 14. The finger and thumb may then be moved separately from the initial contact point 72 to different touch spots 146, 148 while in contact with the touch screen display 10 to, as indicated by the directional arrows 150, 152 and finger contact points 154, 156, as depicted in FIG. 15. In the depicted example, the finger and thumb may then be moved to additional touch points 160, 162 while in contact with the touch screen, as depicted by directional arrows 164, 166 and finger contact points 168, 170, as depicted in FIG. 16. As a final stage of the depicted multi-touch authentication gesture, the finger and thumb may be brought back together again while in contact with the touch screen above a final touch spot, here the first touch spot 106, as depicted by directional arrows 174, 176 and final contact point 178, as depicted in FIG. 17.

By using such multi-touch gestures, the complexity of the authentication gesture may be increased. For example, in an embodiment where two fingers are used and each finger can move from an initial touch spot or spots to any other touch spot, each stage of the multi-touch gesture has 81 possible combinations, i.e., 9 possibilities for each finger at each stage. Thus, each stage of a multi-touch gesture in which two fingers are used increases the complexity of the authentication gesture by a factor of 81.

In one embodiment, authentication gestures are user definable, i.e., a user can define or configure the authentication gesture, and are generated and input by the user when prompted, such as when designating data or a function as having restricted access. That is, the act of designating data or a function as having restricted access may invoke an authentication gesture entry routine (as opposed to a password or PIN entry routine) in which the user performs the desired authentication gesture and the routine stores the gesture as the authentication gesture. In certain embodiments the user may enter the gesture more than once in order to confirm the desired authentication gesture.

In one implementation, the electronic device, such as handheld device 30 provides an indication of the relative strength of the authentication gesture to the user as part of the process of generating or assigning an authentication gesture. Such a strength indication may take into account the length or complexity of the gesture (e.g., how many stages or motions are associated with the gesture), the apparent randomness of the gesture, and whether the gesture is multi-touch. In addition, in some embodiments, the strength indication may take into account whether the gesture corresponds to a recognizable character, such as a letter, number, or common symbol. In such embodiments, an authentication gesture that corresponds to a recognizable character, such as an initial, may be assigned a relatively low strength value, thereby encouraging the user to generate or assign an authentication gesture that is less identifiable and/or less subject to guesswork.

While the use of touch spots in inputting input authentication gestures is one possibility, other gesture input mechanisms are also contemplated by the present disclosure. For example, in one embodiment a dial (FIG. 18) or slider (FIG. 19) might be employed that, to a bystander, might suggest selection and entry of alpha-numeric values disposed about the dial or slider as being the authentication mechanism. However, the actual input to the device may be a gesture associated with screen, i.e., the gesture associated with turning the dial or moving the slider.

Figure 18:
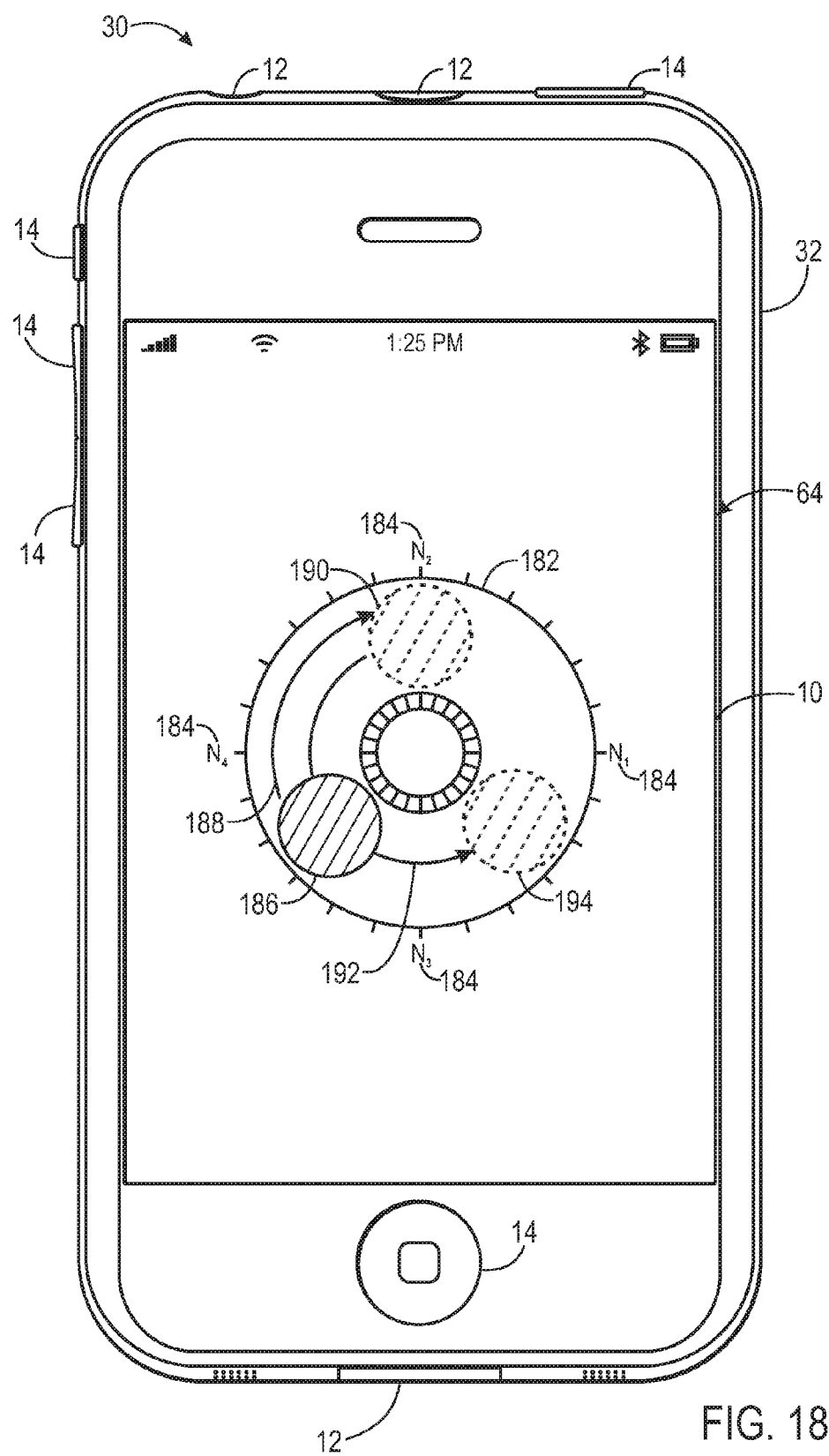
FIG. 18 is a view of a further gesture entry screen in accordance with aspects of the present disclosure.

For example, turning to FIG. 18, a virtual dial 182 may be provided surrounded by numbers 184 or letters that may suggest or appear to correspond to a combination lock. In one embodiment, the authentication gesture may be independent of the displayed numbers 184, with the user contacting the dial 182 at a particular location, as depicted at contact point 186. The user may then move his or her finger on the touch screen display 10 as if turning the dial 182 clockwise and counter-clockwise, as depicted by directional arrow 188 representing an initial move from the starting contact point 186 to a second contact point 190 and directional arrow 192 representing a subsequent move from the second contact point 188 to a third contact point 194.

In an embodiment in which the numbers 184 are independent of the authentication gesture, the numbers 184 may be randomized with each display of the authentication screen 64, with the user knowing to start his or her gesture at an assigned location on the dial 182 regardless of the number 184 displayed nearby. That is, regardless of the numbers displayed nearby, the user may know to enter his authentication gesture by, in one example, touching the dial 182 at the bottom, moving his finger two-thirds of a turn counter-clockwise (i.e., "turn" the dial 182 two-thirds of a turn counter-clockwise) and move his finger back on the dial a quarter turn clockwise. In such an embodiment, a bystander might mistakenly assign significance to the surrounding numbers or letters, which are in fact arbitrary and independent of the authentication process.

In other embodiments, the numbers 184 may have significance in assigning a start point for the gesture, though the gesture itself (not the number) remains the authentication input and the authentication gesture itself remains otherwise independent of the numbers. For example, each invocation of the authentication screen 64 may randomize the numbers 184 about the dial 182. A user entering an authentication gesture may know to touch the dial 182 near the appropriate starting number in the randomized sequence and, from that starting point, enter the appropriate authentication gesture. For example, a user may know to begin his gesture by touching the dial 182 adjacent to wherever the number "3" is displayed and, from that point, to move his finger a half-turn clockwise around the dial 182 followed by a quarter-turn counter-clockwise on the dial 182.

Figure 19:
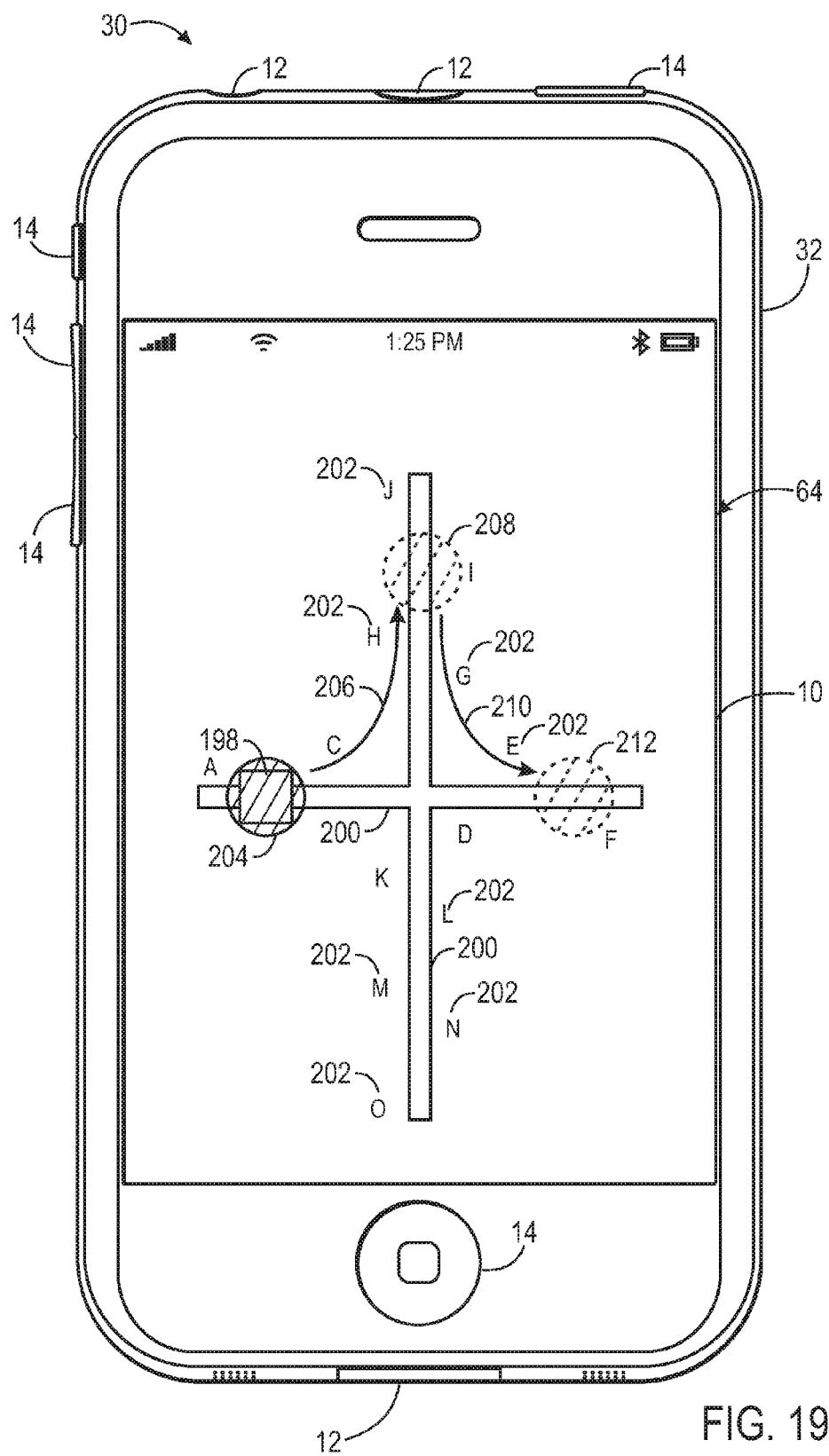
FIG. 19 is a view of another gesture entry screen in accordance with aspects of the present disclosure.

Similarly, turning now to FIG. 19, a slider 198 and corresponding tracks 200 may be displayed on an authentication screen 64, with the gesture associated with moving the slider 198 serving as an authentication input, as opposed to values of characters 202 (e.g., letters or numbers) displayed adjacent to the track 200. In one such embodiment, the characters 202 may be randomized with each invocation of the authentication screen 64, with the gesture being independent of the display of the characters 202. For example, the user may know to start his or her gesture by moving the slider 198 to an initial location regardless of the character 202 displayed nearby, as signified by initial contact point 204. The user may then enter the appropriate authentication gesture by moving his finger along the appropriate track 200 (i.e., by "sliding" the slider 198) to reach the next assigned points associated with the authentication gesture. For example, as depicted in FIG. 19, the user may touch the touch screen at an initial contact point 204 that is not determined by the nearby characters 202 but is instead determined by the assigned authentication gesture. The user may then move his finger on the touch screen, as shown by directional arrow 206, to a subsequent location along the tracks 200, as depicted by contact point 208. The user may then move his finger on the touch screen, as shown by directional arrow 210, to a final location along the tracks 200, as depicted by contact point 212. In this manner a user may input a gesture using a displayed prompt (here slider 198 and tracks 200) that is independent of any characters 202 that may be displayed (randomly or otherwise) in conjunction with the prompt.

As previously discussed, a user authentication gesture input via the virtual dial 182, the slider 198, or other gesture input screens may be assessed by one or more authentication routines implemented as executable code or dedicated circuitry to determine if the input gesture authenticates the user (such as by comparison to a reference gesture). In certain embodiments, the authentication code and/or circuitry may be, or may be converted or translated into, a cryptographic key, as discussed above, based on the gesture input and may utilize the generated key as part of the authentication processing. If the gesture (or a cryptographic key generated based on the gesture) is determined to be authenticating, access to encrypted and/or restricted data and/or functions is allowed. If the input gesture is not authenticating, access to the restricted data and/or functions is not allowed.

As will be appreciated, though the preceding describes various implementations of gesture-based authentication inputs as may be implemented on a touch screen of an electronic device, other types of touch-sensitive structures may also be suitable. For example, in one embodiment a touch pad of a notebook computer may be used to enter authentication gestures on the computer. In such embodiments, the authentication screen, e.g., a nine touch spot prompt, a virtual dial, or a virtual slider, may be displayed on a screen that is separate from the touch pad. A visual indicator, such as a dot or arrow, may be displayed on the authentication screen and may move based on the users motion on the touch pad so that the user can gauge and monitor his or her motion on the touch pad while entering the authentication gesture.

Figure 20:
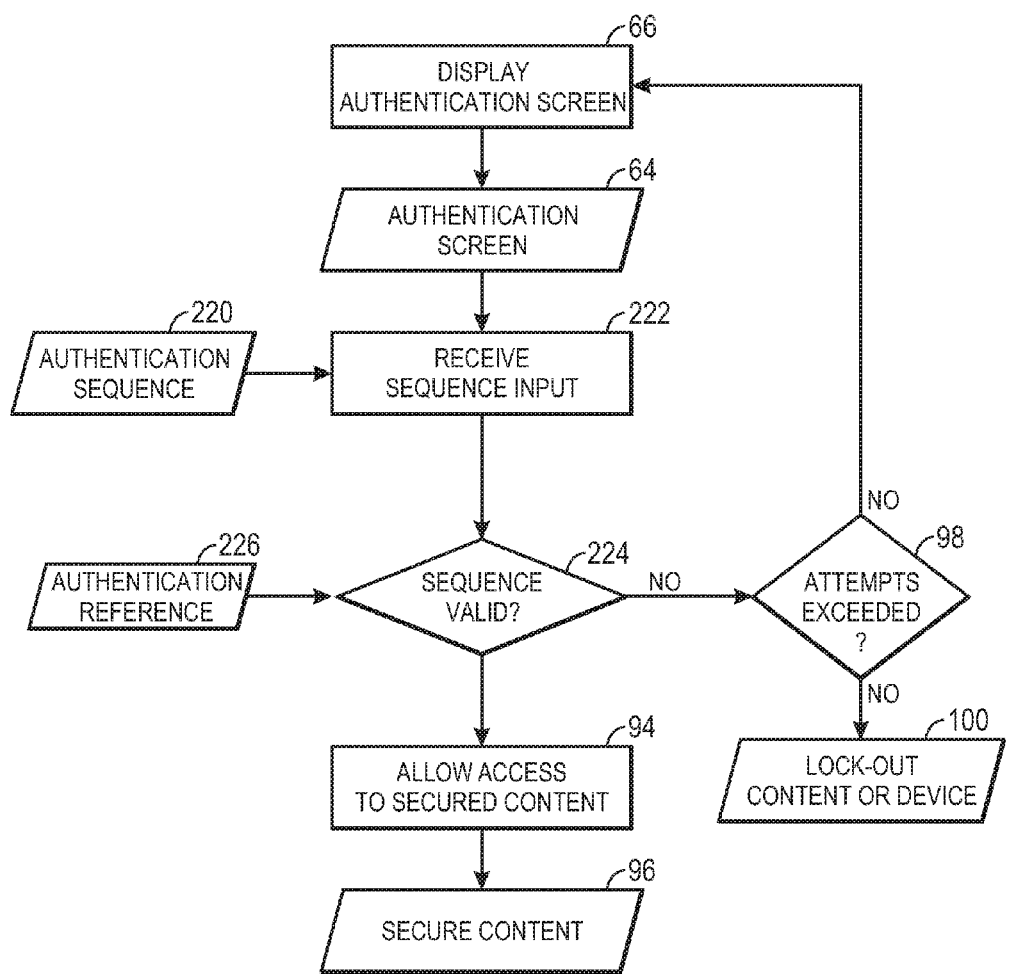
FIG. 20 is a flowchart depicting the input and validation of a sequence for authenticating a user, in accordance with aspects of the present disclosure.

While the preceding describes various user authentication schemes where authentication is based upon a gesture input, other authentication schemes are also presently contemplated which are user definable and do not utilize alphanumeric or biometric inputs. For example, in certain embodiments, a user input sequence may constitute the authentication to access encrypted and/or restricted data, functions, and so forth. For example, turning now to FIG. 20, a flowchart depicts representative acts, inputs, and outputs associated with one embodiment in which a sequence is employed to authenticate a user. As depicted in FIG. 20, an authentication screen 64 may be displayed (block 66), such as due to a user invoking such an authentication screen, as discussed above. In one embodiment, the authentication screen 64 may include a screen depicting objects or icons with which a user may interact (such as via a touch screen, touch pad, mouse, or keyboard) to input an authentication sequence 220 to an electronic device 8.

As depicted in FIG. 7, the authentication sequence 220 may be received (block 222) as a sequence input by an electronic device 8 or processor 16 of such a device (FIG. 1). The authentication sequence 220 may then be evaluated (block 224), such as by suitable code executing on a processor 16, to determine whether or not the authentication sequence 220 is valid. In one embodiment, the input authentication sequence may be converted into a cryptographic key, as discussed above, which may be used in the authentication process. For example, in such an implementation, a numeric property associated with each step of the input sequence (such as a numeric property associated with or assigned to each object selected in sequence) may be used to generate an input string provided to a hash or other encryption function to generate a cryptographic key. In this disclosure, the term "authentication sequence" may refer to both a sequence converted to a cryptographic key or to a sequence persisted in a manner that allows it to be compared to other sequences or references In one embodiment, the authentication sequence 220 (or a cryptographic key based on the input sequence) may be compared with an authentication reference 226 stored on the device 8. The authentication reference 226 may be preconfigured on the device 8 and may not be changed by the user in one embodiment. However, in another embodiment, the user may enter and confirm the authentication reference 226 on the device 8 as part of configuring one or more security features on the device 8.

If the authentication sequence 220 is determined to be valid at block 224, a user may be granted access (block 94) to view or use previously secure content 96, e.g., encrypted or hidden data or functions (applications, network connections, and so forth). However, if the authentication sequence 220 is not determined to be valid at block 224, the secure content 96 remains unavailable or invisible to the user. In one embodiment, failure to validate an authentication sequence 220 may cause a subsequent determination (block 98) of whether a set number of allowed authentication attempts (such as three or five) has been exceeded. If the set number of allowed attempts has been exceeded, the device 8 may be inactivated (block 100) or no additional attempts at authentication may be allowed for a set time period or pending a reset of the security parameters. However, if the set number of allowed attempts has not been exceeded, authentication screen 64 may continue to be displayed (block 66), thereby allowing the user another attempt to successfully enter the proper authentication sequence 220.

Figure 21:
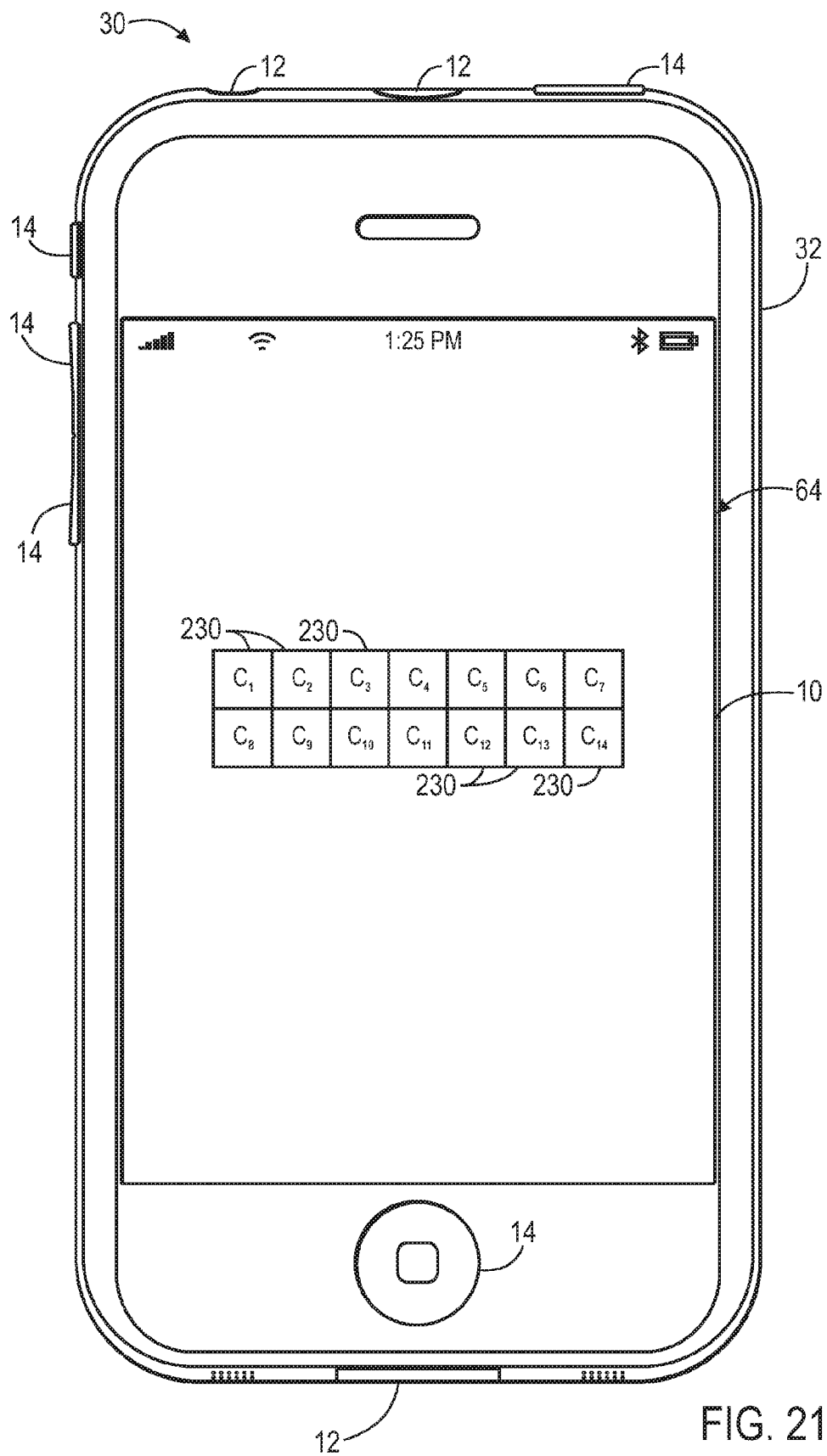
FIG. 21 is a view of a color sequence entry screen in accordance with aspects of the present disclosure.
Figure 22:
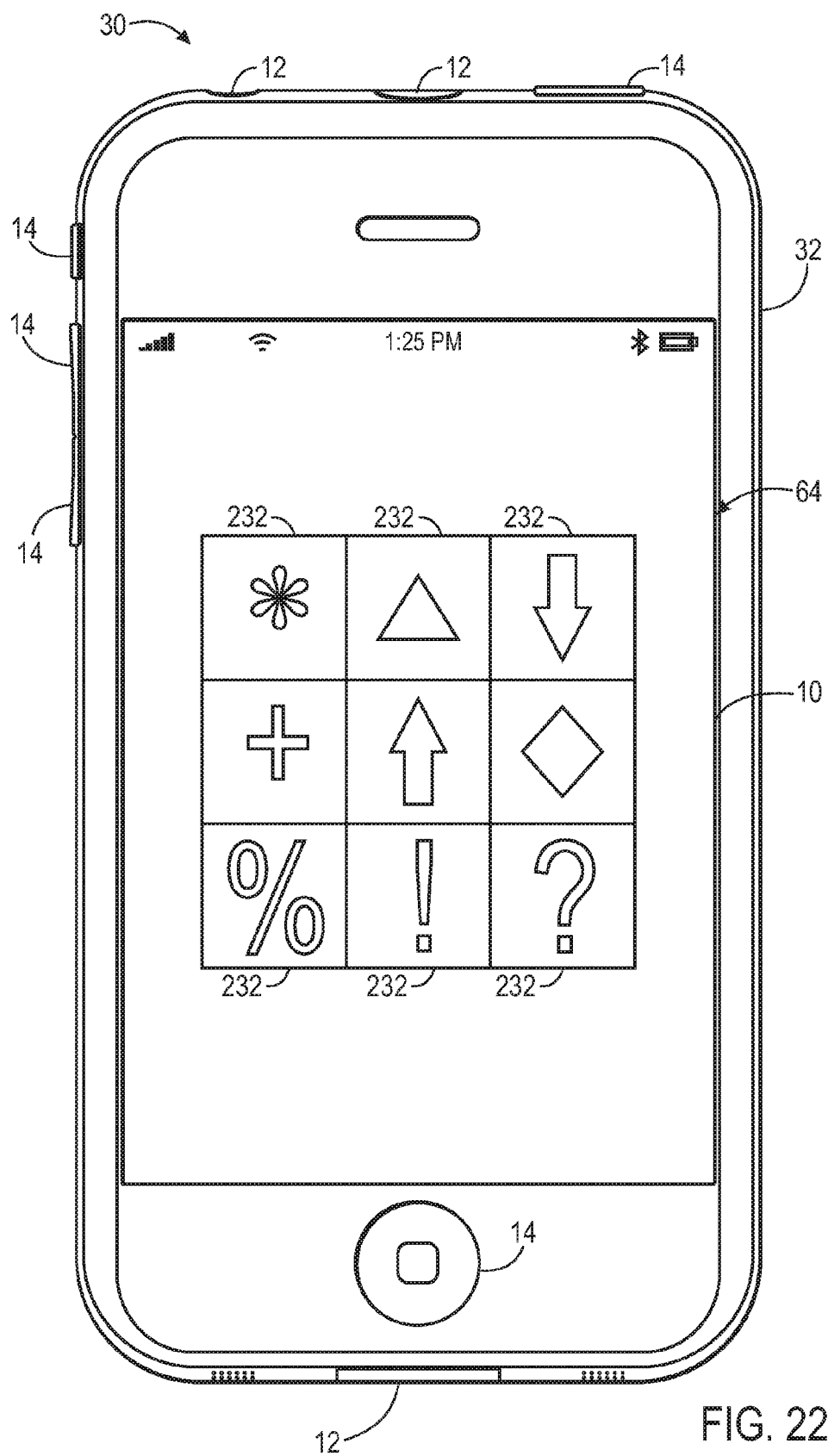
FIG. 22 is a view of a symbol sequence entry screen in accordance with aspects of the present disclosure.

With the foregoing in mind and turning to FIGS. 21 and 22, examples of an implementation of an authentication screen 64 for use with a sequence is depicted with respect to a handheld device 30 having a display 10 which is a touch screen. In these examples, authentication screens 64 are displayed that depict colors (FIG. 21) and symbols (FIG. 22) which may be used by a user to enter an authenticating sequence 220. Turning to FIGS. 21 and 22, in certain embodiments, different colors 230 (depicted as $C_1$-$C_{14}$ in FIG. 21), symbols 232 (FIG. 22), or other markers may be displayed (such as in a continuum, spectrum, grid, array or as spaced apart spots) upon invocation of an authentication screen 64. In such embodiments, a user may be authenticated by selecting (such as by touching) a certain sequence of colors 230, symbols 232, or other markers. For example, in the context of FIG. 21, a user authentication sequence 220 may be a sequence of four colors 230, some of which may be repeated. In such an example, the user may touch (in a touch screen implementation) the proper colors 230 in the proper sequence (such as $C_4$, $C_{13}$, $C_6$, $C_{13}$). In other embodiments, the user may select the proper sequence of colors using a mouse and cursor (i.e., a point and click type interface), a keyboard or keypad, or other suitable user input mechanism Likewise, in the context of FIG. 22, the proper symbols 232 may be selected by the user in the proper sequence to authenticate the user. As will be appreciated, the colors 230, symbols, 232, or other markers may or may not be randomized in terms of their position or order with each invocation of the authentication screen 64.

Figure 23:
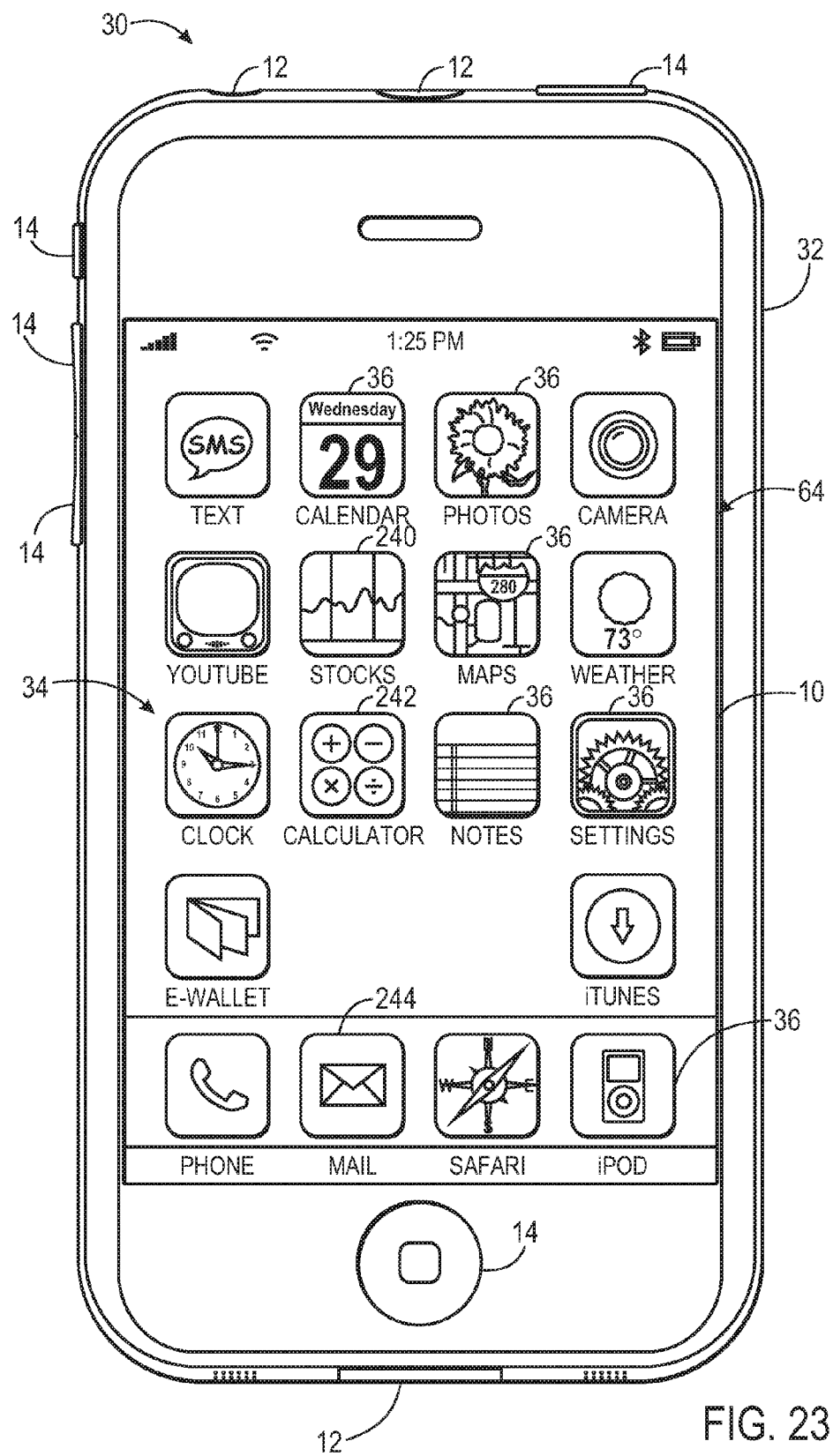
FIG. 23 is a view of a sequence entry screen based on a user interface screen of an electronic device in accordance with aspects of the present disclosure.

In certain embodiments, it may be desirable to invoke and use an authentication screen 64 that does not appear to be related to user authentication. For example, the authentication screen 64 may appear to be a standard user interface or application screen that would not typically be associated with user authentication by a bystander. Turning to FIG. 23, one such implementation is shown in which the authentication screen 64 corresponds to the main or root user interface screen of a handheld device 30, as discussed with respect to FIG. 2. In such an implementation, the displayed icons 36 may be selected by the user in a given sequence to provide authentication and do not actually correspond to opening an application, i.e., the authentication screen 64 has the appearance of the user interface, but not the functionality. In this manner, a user may authenticate their identity while outwardly appearing to do not more than opening an application on the device. For example, in the depicted embodiment of FIG. 23, the user may enter an authentication sequence 220 by sequentially selecting the Stocks icon 240, the Calculator icon 242, the Mail icon 244, and the Calculator icon 242.

Figure 24:
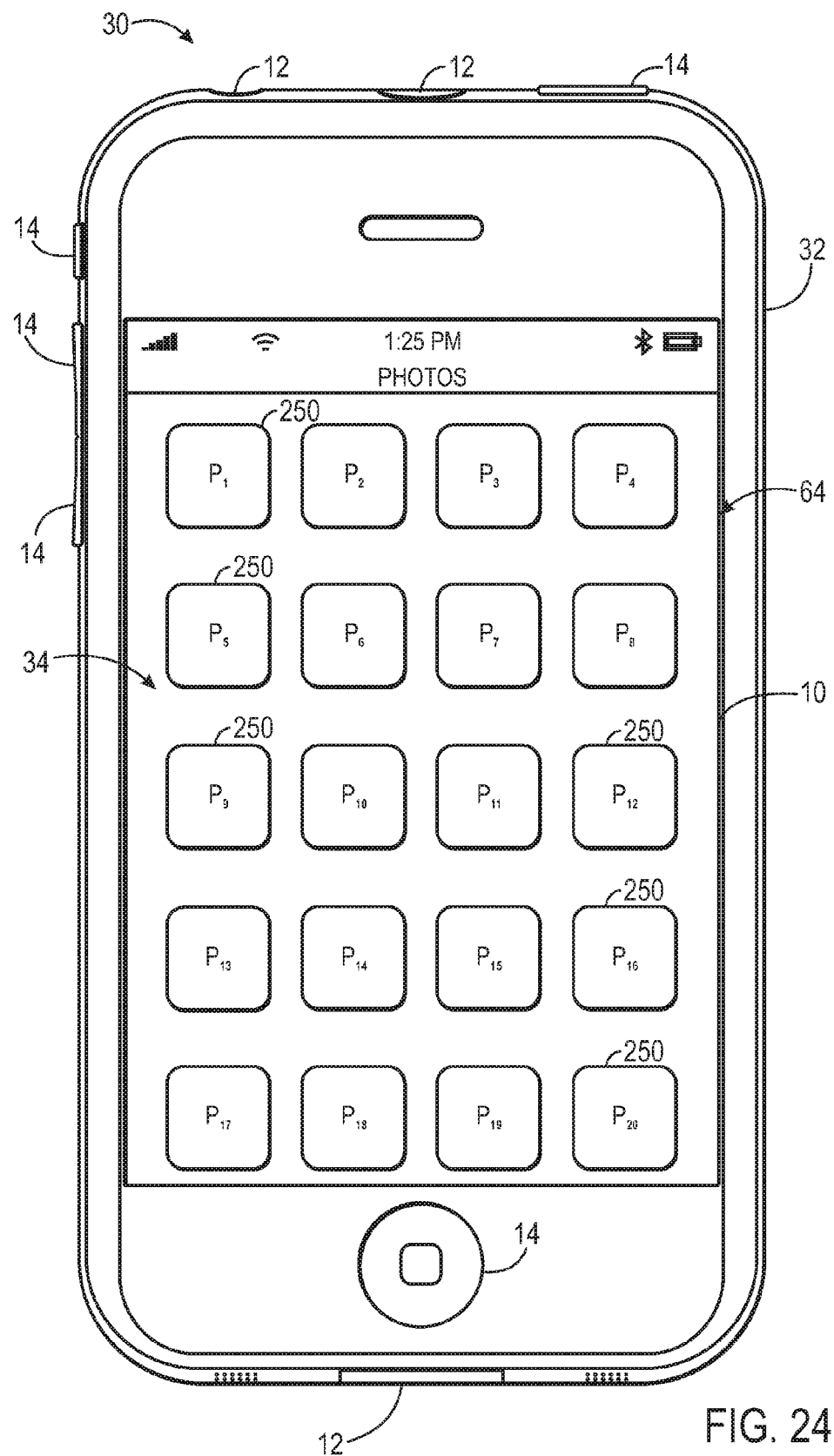
FIG. 24 is a view of a sequence entry screen based on a photo album screen in accordance with aspects of the present disclosure.

Similarly, in another embodiment, the authentication screen 64 may appear to correspond to a standard screen from an existing application, such as a photo album application, a music application, a map application, a stock application, a clock application, an e-mail application and so forth. By way of example, and referring now to FIG. 24, the authentication screen 64 is depicted as corresponding to a screen from a photo album application on which various pictures 250 (depicted as $P_1$-$P_{20}$ in FIG. 24) are displayed. In such an embodiment, a user may be authenticated by selecting, such as by touching or using a mouse, a certain sequence of pictures 250. For example, a user authentication sequence 220 may be a sequence of five pictures 250, some of which may be repeated. In such an example, the user may select the proper pictures 250 from the displayed authentication screen 64 in the proper sequence (such as $P_{16}$, $P_2$, $P_{16}$, $P_{18}$, $P_9$). As will be appreciated, the pictures 250 may or may not be randomized in terms of their position or order with each invocation of the authentication screen 64.

Figure 25:
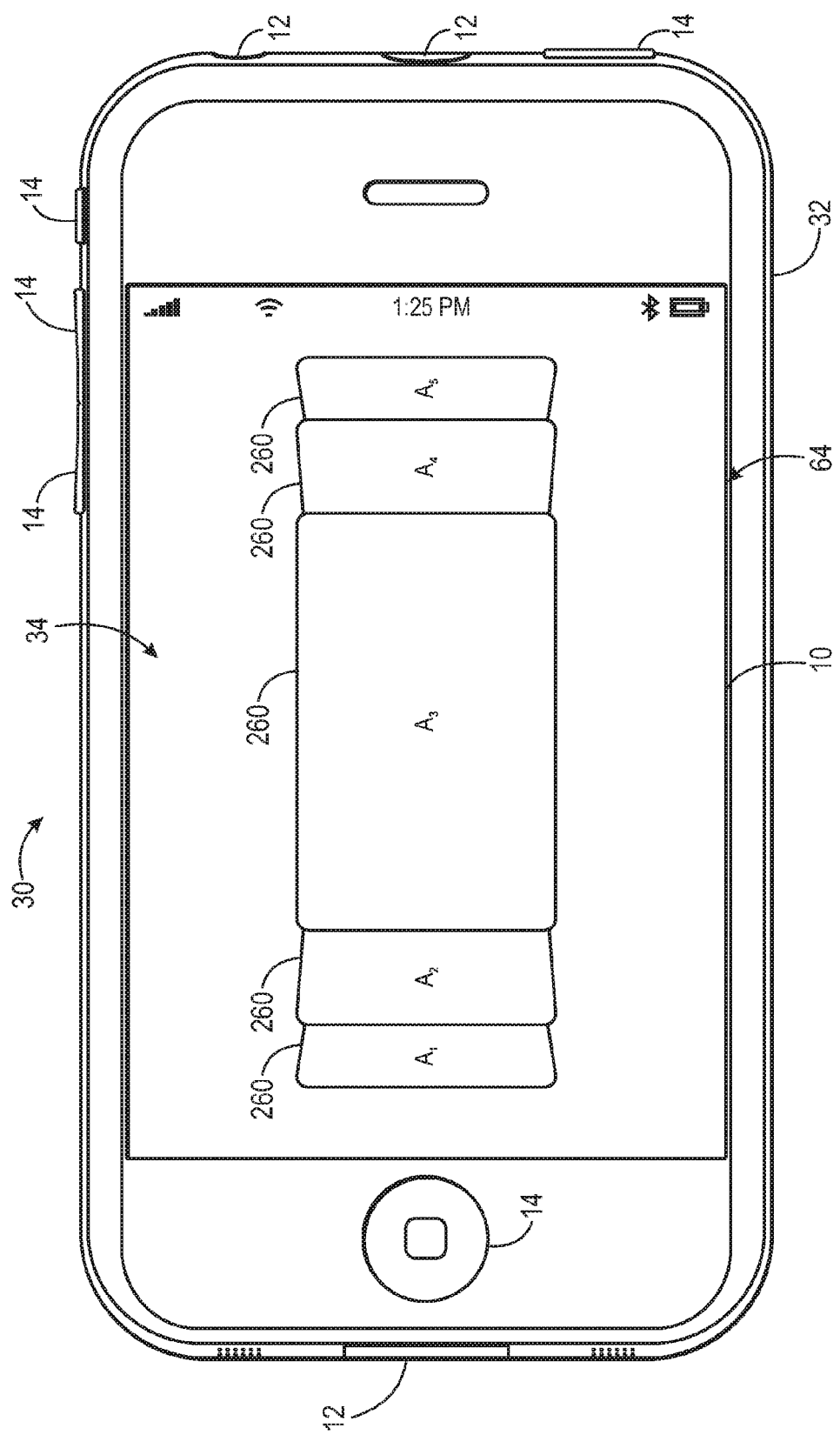
FIG. 25 is a view of a sequence entry screen based on a media player screen in accordance with aspects of the present disclosure.

By way of additional example, and referring now to FIG. 25, the authentication screen 64 may appear to correspond to a standard screen from a music application, such as iTunes®. In the depicted example, the authentication screen 64 is depicted as corresponding to an album selection screen on which the covers 260 of various albums (depicted as $A_1$-$A_5$ in FIG. 25) are displayed. In one such implementation, more covers 260 may be viewed and selected by swiping a finger across the covers 260 to cause new albums to be displayed while other covers 260 exit the view. In such an embodiment, a user may be authenticated by selecting, such as by touching, a certain sequence of covers 260. For example, a user authentication sequence 220 may be a sequence of four covers 260, some of which may be repeated and some of which may need to be moved into or out of view on the authentication screen 64 to allow selection of all covers 260 in the authentication sequence 220. In such an example, the user may select the proper covers 260 from the displayed authentication screen 64 in the proper sequence (such as $A_2$, $A_{21}$ (not shown), $A_2$, $A_{32}$ (not shown)). As will be appreciated, the covers 260 may or may not be randomized in terms of their position or order with each invocation of the authentication screen 64.

While the preceding examples describe two applications with screens that may be suitable for sequence-based authentication, other types of application screens may also be suitable for use as an authentication screen 64. For example, a map screen from which a user might select locations or addresses in a particular sequence may also be suitable for sequence-based user authentication. Likewise, a contact list from an e-mail or phone application, dates from a calendar application, world clocks from a clock application, stocks listed in a stock application, songs from a playlist, or bookmarks in a web browser application may all be suitable for use in an authentication screen 64 directed to entry of an authentication sequence 220.

As with the gesture-based inputs previously described, in one embodiment sequence-based authentications are user definable, i.e., a user can define or configure the authentication sequence, and are generated and input by the user when prompted, such as when designating data or a function as having restricted access. That is, the act of designating data or a function as having restricted access may invoke an authentication sequence entry routine (as opposed to a password or PIN entry routine) in which the user enters the desired sequence and the routine stores the sequence as the authentication sequence. In certain embodiments the user may enter the sequence more than once in order to confirm the desired authentication sequence.

Gesture and sequence authentication as discussed herein provide two approaches of allowing a user to generate and use authenticators that are not alphanumeric passwords or PINS and are not biometric markers. In addition, other non-alphanumeric and non-biometric approaches may be used to provide or enhance data security. For example, in certain embodiments of the present disclosure the input structures 14 (FIG. 1) of an electronic device 8 may include features such as a Global Positioning System (GPS) or similar system which generates inputs in the form of position information for the device 8. In such implementations, the device 8, such as a handheld device 30 which may be carried with a person, may utilize such position information in the authentication process.

Figure 26:
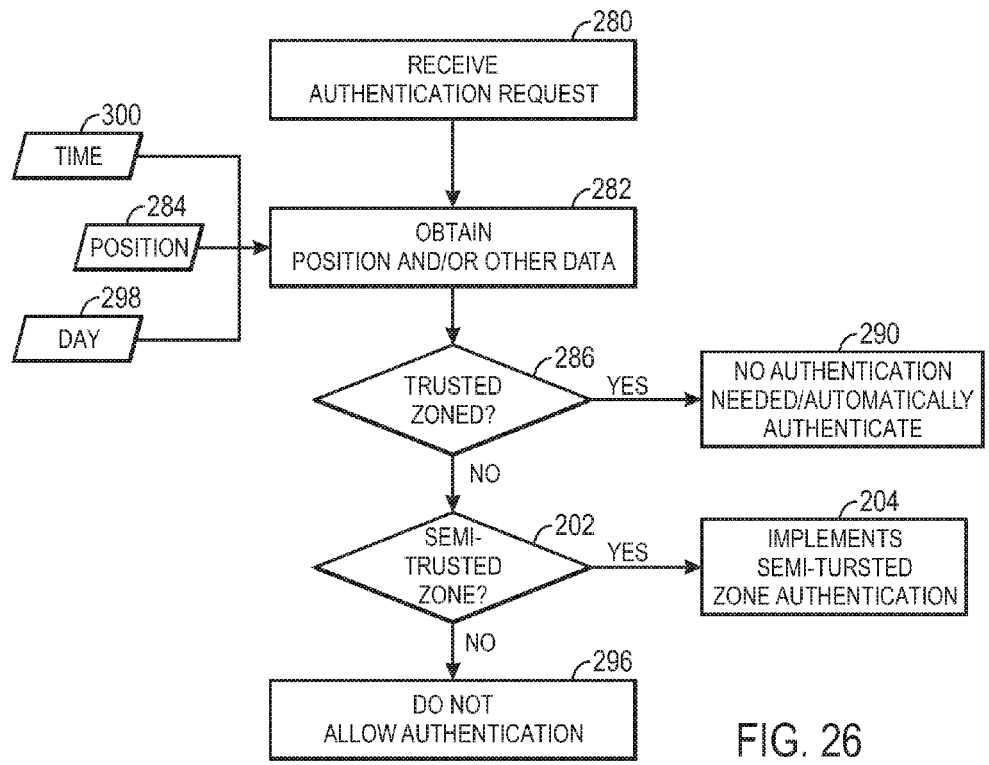
FIG. 26 is a flowchart depicting the use of position information in controlling user authentication in accordance with aspects of the present disclosure.

Turning to FIG. 26, in one such example, a device 8, such as a handheld device 30, may receive (block 280) a request to implement a user authentication scheme, such as by a user using a gesture as discussed herein to invoke authentication or by the user trying to access a program or data that has restricted access. Upon receipt of such a request, a routine may obtain (block 282) current position data 284 for the handheld device 30 (such as from a GPS or other position sensing circuitry). The position information 284 may then be evaluated to determine whether the position 284 is within a defined zone in which authentication is allowed or needed.

For example, in the depicted example if the position 284 of the handheld device 30 is within what has been defined as a trusted zone, as determined at block 286, no user authentication may be requested or authentication may be automatic (i.e., no user input is needed) (block 290) to access the restricted data or functions. By way of example, a user may have defined his or her home or office as a trusted zone where authentication is automatic. In such an example, a user may immediately access data, programs, networks and so forth within the trusted zone (e.g., home or the office) without providing any authentication.

If the position of the handheld device 30 is not within a trusted zone, a determination (block 292) may be made whether the handheld device 30 is in a semi-trusted zone where authentication is allowed and requested. For example, the user may designate specific locations (such as stores, streets, parks, stadiums, and so forth) or general areas or regions within a town or city in which the user typically shops or visits as semi-trusted zones where restricted functions or data may be accessed with user authentication. Thus, the user may designate a grocery store or other store frequently visited as a semi-trusted zone, may designate all locations within five miles from home or on a daily commute route as a semi-trusted zone, or may designate any other frequented specific or general area as a semi-trusted zone. If the position of the handheld device 30 is within such a semi-trusted zone when the authentication request is received, a user authentication scheme, such as one of the gesture or sequence-based schemes described herein or a password, PIN (or other alphanumeric scheme) or biometric authentication, may be implemented (block 294) on the handheld device 30.

Further, different levels of semi-trusted zones may be designated to correspond to different types of authentication schemes, i.e., there may be different levels of trust distinguishing the semi-trusted zones. Thus, certain semi-trusted zones may cause a gesture-based authentication scheme to be invoked, others may cause a sequence-based authentication scheme to be invoked, and other may cause a password or PIN based authentication scheme to be invoked. In this manner, an authentication scheme appropriate for the setting may be invoked. For example, those settings where a bystander is most likely to observe the authentication process may invoke an authentication scheme that is less susceptible to observation.

Turning back to FIG. 26, in the depicted example, if the position 284 is not determined to be in a trusted or semi-trusted zone, no user authorization may be allowed (block 296). For example, if the handheld device 30 is not in a zone associated with the users home, work, commute, or standard shopping areas, the handheld device 30 may not invoke an authentication routine to allow access to confidential functions or data. In this manner, at unapproved locations the handheld device 30 will not allow an authorization to be attempted because no authentication routine, or screen, can be invoked.

As will be appreciated, the position data 284 alone maybe used to designate trust and semi-trust relationships as described above. In other embodiments, however, additional information may be obtained by the handheld device 14 from other input structures 14, such as a clock and/or calendar of the device 30, and may be used in evaluating the trust relationships and what level of authentication is appropriate. For example, a trusted or semi-trusted zone may be defined not just by position location but also by day 298 and/or time 300. In one such example, a zone associated with a work location may be defined as being trusted on weekdays between 8:00 AM and 5:00 PM, after which it becomes a semi-trusted zone. Conversely, commute locations may be defined as semi-trusted only on weekday before 8:00 AM and after 5:00 PM while shopping locations may be defined as semi-trusted only on weekends between 10:00 AM and 10:00 PM. In certain embodiments, being in a semi-trusted or trusted zone outside of the defined days or time may result in the level or type of authentication being elevated, such as from password to gesture-based authentication, but authentication is still allowed, e.g., the zone still remains semi-trusted though the degree or type of authentication is changed.

Figure 27:
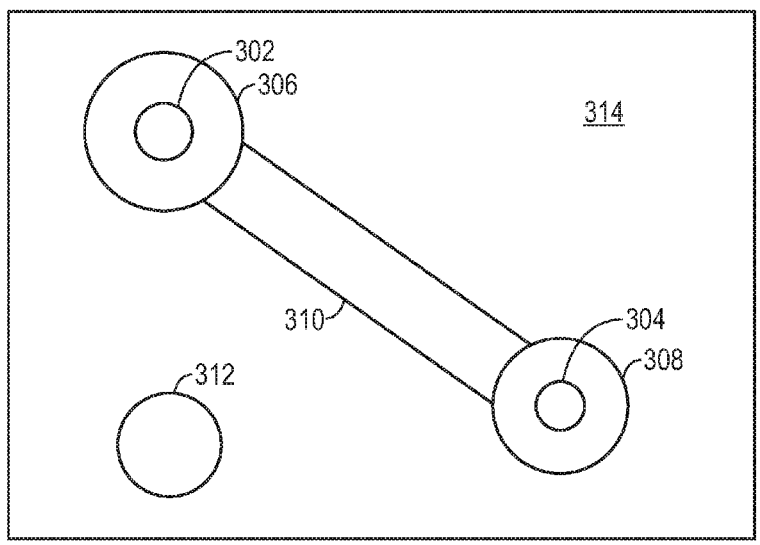
FIG. 27 is view of trust relationships as may be used in controlling user authentication in accordance with aspects of the present disclosure.

Turning to FIG. 27, an example of such a position-based authentication control is depicted. In this example, two trusted zones are depicted, such as a respective home trusted zone 302 and office trusted zone 304. In one embodiment, the office trusted zone is only trusted during working hours and days and, outside of these day and time constraints, is only semi-trusted. Thus at the office during a work day and during work hours, user authentication may be automated or not requested, but outside of these days and time, some level of user authentication, such as gesture or sequence-based authentication, may be requested.

Each of the trusted zones 302, 304 may be surrounded by respective semi-trusted zones 306 and 308 that may each be associated with a different type of user authentication, such as to access confidential or E-wallet information (e.g., bank account or credit card information). For example, semi-trusted zone 306 may be associated with a gesture-based authentication scheme while semi-trusted zone 308 may be associated with a sequence-based authentication scheme based on differing degrees of perceived security. Likewise, a corridor between the work and home trusted zones 302, 304 may be designated as a semi-trusted zone 310 within which a password or PIN-based authentication scheme is employed to access E-wallet or other confidential data. Likewise, the user may designate a frequent shopping area, such as a shopping mall or store, to also be a semi-trusted zone 312 where user authentication is allowed and requested, such as via a gesture based authentication scheme, to access bank accounts, credit cards, and other confidential information.

In one embodiment, as with the trusted zones 302, 304, each semi-trusted zone 306, 308, 310, 312 may be associated with respective days and/or times. Outside of these respective days and times, the semi-trusted zone may be associated with an elevated type or degree of user authentication or may no longer be considered a semi-trusted zone. In areas 314 that are neither trusted or semi-trusted zones, access to restricted or confidential information (e.g., the aforementioned credit card, bank account, or E-wallet data) may be prevented, such as by not allowing authorization screens to be invoked in these areas.

The foregoing demonstrate various ways in which user authentication may be regulated, invoked, and/or implemented on an electronic device. While certain of the examples have been provided in the context of a handheld device, the techniques disclosed herein are equally applicable to any type of electronic device on which access to data or functions (such as applications or network connections) is limited or otherwise regulated. For example, access to bank account, credit card, debit card, brokerage account, or other similar confidential information may be limited in view of the present techniques based on a user authentication scheme as disclosed herein and/or in view of location, day, and/or time limits as discussed herein. Further, as discussed, invocation of an authentication scheme may itself be hidden, i.e., no visual indication of how to invoke the authentication screens or routines may be displayed, such that a user invokes the authentication screens or routines by use of a gesture or other mechanism that does not depend on a visual cue to allow a user to prompt authentication.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A non-transitory computer readable storage medium storing one or more programs, the one or more programs comprising instructions, which when executed by an electronic device with a touch-sensitive display, cause the device to:
  display, on the touch-sensitive display, an authentication screen comprising a plurality of images associated with a home screen, including a plurality of application launch icons, such that the authentication screen has the appearance but not the functionality of the home screen, wherein the authentication screen does not include a visual indication that the authentication screen is used for authentication;
  receive an input based on a sequence of interactions with the plurality of images;
  evaluate the input to determine if the input authenticates a user;
  in response to a determination that the input authenticates the user, grant the user access to secure content on the device; and
  in response to a determination that the input does not authenticate the user, maintain unavailability of the secure content on the device to the user.

2. The non-transitory computer readable storage medium of claim 1, wherein the plurality of images are reordered each time the authentication screen is displayed.

3. The non-transitory computer readable storage medium of claim 1, wherein the plurality of images have respective visual appearances of the plurality of application launch icons.

4. A method, comprising:
at an electronic device with a touch-sensitive display:
  displaying on the touch-sensitive display an authentication screen having the appearance but not the functionality of an application screen, the authentication screen including a plurality of graphical elements for the application screen, wherein the authentication screen does not include a visual indication that the authentication screen is used for authentication;
  receiving an input based on a sequence of interactions with the authentication screen;
  evaluating the input to determine if the input authenticates a user;
  in response to a determination that the input authenticates the user, granting the user access to secure content on the device; and
  in response to a determination that the input does not authenticate the user, maintaining unavailability of the secure content on the device to the user.

5. The method of claim 4, wherein the authentication screen has the appearance of a photo album application screen, a music application screen, a map application screen, a stock application screen, a clock application screen, a contact list application screen, a calendar application screen, a browser application screen, or an e-mail application screen.

6. The method of claim 4, wherein the authentication screen comprises one or more pictures found in a photo album or media player application.

7. The method of claim 4, wherein:
  evaluating the input to determine if the input authenticates a user comprises evaluating the input to determine if the input corresponds to a reference sequence associated with the user;
  the determination that the input authenticates the user comprises a determination that the input corresponds to the reference sequence; and
  the determination that the input does not authenticate the user comprises a determination that the input does not correspond to the reference sequence.

8. The non-transitory computer readable storage medium of claim 1, comprising instructions which cause the device to:
  evaluate the input to determine if the input corresponds to a reference sequence associated with the user;
  wherein:
    the determination that the input authenticates the user comprises a determination that the input corresponds to the reference sequence; and
    the determination that the input does not authenticate the user comprises a determination that the input does not correspond to the reference sequence.

9. A method, comprising:
at an electronic device with a touch-sensitive display:
  displaying, on the touch-sensitive display, an authentication screen comprising a plurality of images associated with a home screen, including a plurality of application launch icons, such that the authentication screen has the appearance but not the functionality of the home screen, wherein the authentication screen does not include a visual indication that the authentication screen is used for authentication;
  receiving an input based on a sequence of interactions with the plurality of images;
  evaluating the input to determine if the input authenticates a user;
  in response to a determination that the input authenticates the user, granting the user access to secure content on the device; and
  in response to a determination that the input does not authenticate the user, maintaining unavailability of the secure content on the device to the user.

10. The method of claim 9, wherein the plurality of images are reordered each time the authentication screen is displayed.

11. The method of claim 9, wherein the plurality of images have respective visual appearances of the plurality of application launch icons.

12. The method of claim 9, wherein:
  evaluating the input to determine if the input authenticates a user comprises evaluating the input to determine if the input corresponds to a reference sequence associated with the user;

the determination that the input authenticates the user comprises a determination that the input corresponds to the reference sequence; and the determination that the input does not authenticate the user comprises a determination that the input does not correspond to the reference sequence.

13. An electronic device, comprising:
a touch-sensitive display;
one or more processors;
memory; and
one or more programs, wherein the one or more programs are stored in the memory and configured to be executed by the one or more processors, the one or more programs including instructions for:
  displaying, on the touch-sensitive display, an authentication screen comprising a plurality of images associated with a home screen, including a plurality of application launch icons, such that the authentication screen has the appearance but not the functionality of the home screen, wherein the authentication screen does not include a visual indication that the authentication screen is used for authentication;
  receiving an input based on a sequence of interactions with the plurality of images;
  evaluating the input to determine if the input authenticates a user;
  in response to a determination that the input authenticates the user, granting the user access to secure content on the device; and
  in response to a determination that the input does not authenticate the user, maintaining unavailability of the secure content on the device to the user.

14. The electronic device of claim 13, wherein the plurality of images are reordered each time the authentication screen is displayed.

15. The electronic device of claim 13, wherein the plurality of images have respective visual appearances of the plurality of application launch icons.

16. The electronic device of claim 13, including instructions for:
  evaluating the input to determine if the input corresponds to a reference sequence associated with the user;
  wherein:
    the determination that the input authenticates the user comprises a determination that the input corresponds to the reference sequence; and
    the determination that the input does not authenticate the user comprises a determination that the input does not correspond to the reference sequence.

17. An electronic device, comprising:
a touch-sensitive display;
one or more processors;
memory; and
one or more programs, wherein the one or more programs are stored in the memory and configured to be executed by the one or more processors, the one or more programs including instructions for:
  displaying on the touch-sensitive display an authentication screen having the appearance but not the functionality of an application screen, the authentication screen including a plurality of graphical elements for the application screen, wherein the authentication screen does not include a visual indication that the authentication screen is used for authentication;
  receiving an input based on a sequence of interactions with the authentication screen;
  evaluating the input to determine if the input authenticates a user;
  in response to a determination that the input authenticates the user, granting the user access to secure content on the device; and
  in response to a determination that the input does not authenticate the user, maintaining unavailability of the secure content on the device to the user.

18. The device of claim 17, wherein the authentication screen has the appearance of a photo album application screen, a music application screen, a map application screen, a stock application screen, a clock application screen, a contact list application screen, a calendar application screen, a browser application screen, or an e-mail application screen.

19. The device of claim 17, wherein the authentication screen comprises one or more pictures found in a photo album or media player application.

20. The device of claim 17, including instructions for:
  evaluating the input to determine if the input corresponds to a reference sequence associated with the user;
  wherein:
    the determination that the input authenticates the user comprises a determination that the input corresponds to the reference sequence; and
    the determination that the input does not authenticate the user comprises a determination that the input does not correspond to the reference sequence.

21. A non-transitory computer readable storage medium, comprising:
a touch-sensitive display;
one or more processors;
memory; and
one or more programs, wherein the one or more programs are stored in the memory and configured to be executed by the one or more processors, the one or more programs including instructions for:
  display on the touch-sensitive display an authentication screen having the appearance but not the functionality of an application screen, the authentication screen including a plurality of graphical elements for the application screen, wherein the authentication screen does not include a visual indication that the authentication screen is used for authentication;
  receive an input based on a sequence of interactions with the authentication screen;
  evaluate the input to determine if the input authenticates a user;
  in response to a determination that the input authenticates the user, grant the user access to secure content on the device; and
  in response to a determination that the input does not authenticate the user, maintain unavailability of the secure content on the device to the user.

22. The non-transitory computer readable storage medium of claim 21, wherein the authentication screen has the appearance of a photo album application screen, a music application screen, a map application screen, a stock application screen, a clock application screen, a contact list application screen, a calendar application screen, a browser application screen, or an e-mail application screen.

23. The non-transitory computer readable storage medium of claim 21, wherein the authentication screen comprises one or more pictures found in a photo album or media player application.

24. The non-transitory computer readable storage medium of claim 21, comprising instructions which cause the device to:

evaluate the input to determine if the input corresponds to a reference sequence associated with the user; and wherein:
 the determination that the input authenticates the user comprises a determination that the input corresponds to the reference sequence; and
 the determination that the input does not authenticate the user comprises a determination that the input does not correspond to the reference sequence.

* * * * *